(12) United States Patent
Togo et al.

(10) Patent No.: US 11,657,350 B2
(45) Date of Patent: May 23, 2023

(54) INFORMATION PROCESSING APPARATUS, WORKFLOW TEST APPARATUS, AND NON-TRANSITORY COMPUTER READABLE MEDIUM

(71) Applicant: FUJIFILM BUSINESS INNOVATION CORP., Tokyo (JP)

(72) Inventors: Atsushi Togo, Kanagawa (JP); Kiyoshi Tashiro, Kanagawa (JP); Yoshihisa Matsuo, Kanagawa (JP); Kazuya Iimura, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 787 days.

(21) Appl. No.: 16/213,072

(22) Filed: Dec. 7, 2018

(65) Prior Publication Data

US 2019/0279127 A1  Sep. 12, 2019

(30) Foreign Application Priority Data

Mar. 8, 2018 (JP) .............................. JP2018-041655
Mar. 8, 2018 (JP) .............................. JP2018-041656

(51) Int. Cl.
*G06Q 10/06* (2023.01)
*G06F 3/048* (2013.01)
(Continued)

(52) U.S. Cl.
CPC ......... *G06Q 10/0633* (2013.01); *G06F 3/048* (2013.01); *G06Q 10/067* (2013.01); *G06F 11/3664* (2013.01)

(58) Field of Classification Search
CPC .............. G06Q 10/0633; G06Q 10/067; G06F 3/048; G06F 11/3664
(Continued)

(56) References Cited

U.S. PATENT DOCUMENTS

| | | | | |
|---|---|---|---|---|
| 2017/0277625 A1* | 9/2017 | Shtuchkin | ........... | G06F 11/3688 |
| 2017/0315714 A1* | 11/2017 | Shyamsundar | ..... | G06F 16/9038 |
| 2018/0025503 A1* | 1/2018 | Tsai | ..................... | G06V 10/751 |
| | | | | 382/100 |

FOREIGN PATENT DOCUMENTS

JP  2008-041056 A  2/2008

OTHER PUBLICATIONS

Ikeda, et al., Provenance-based debugging and drill-down in data-oriented workflows, 2012 IEEE 28th International Conference on Data Engineering, pp. 1249-1252 (2012) (Year: 2012).*

* cited by examiner

*Primary Examiner* — Charles Guiliano
(74) *Attorney, Agent, or Firm* — Oliff PLC

(57) ABSTRACT

There is provided an information processing apparatus for testing a workflow, the information processing apparatus including: an acquisition unit configured to acquire information about a first user who executes a first work step of the workflow; and a display unit configured to display a first simulation screen based on the information acquired by the acquisition unit, the first simulation screen simulating a first screen on which the first user executes the first work step of the workflow, wherein the display unit displays a second simulation screen, the second simulation screen simulating a second screen on which a second user executes a second work step of the workflow, the second work step of the workflow executed by the second user following the execution of the first work step by the first user on the first screen.

18 Claims, 22 Drawing Sheets

(51) Int. Cl.
*G06Q 10/0633* (2023.01)
*G06Q 10/067* (2023.01)
*G06F 11/36* (2006.01)

(58) Field of Classification Search
USPC .................................................... 705/7.27
See application file for complete search history.

FIG.4

| USER ID | NAME | E-MAIL ADDRESS | ORGANIZATION | JOB TITLE |
|---|---|---|---|---|
| User0001 | TARO FUJI | fuji.taro@hoge.com | HOGE DEPARTMENT | GENERAL |
| User0002 | ICHIRO SUZUKI | suzuki.ichiro@hoge.com | HOGE DEPARTMENT | MANAGER |
| ... | | | | |

FIG.5

| USER ID | DEVICE ID | DISPLAY LANGUAGE | FILE STORAGE LOCATION | E-MAIL NOTIFICATION | E-MAIL NOTIFICATION FREQUENCY |
|---|---|---|---|---|---|
| User0001 | User0001-Desktop1 | ENGLISH | W-Folder | On | ONCE A DAY |
| User0002 | User0002-Mobile1 | JAPANESE | G-Drive | On | EVERY TIME |
| User0002 | User0002-Desktop1 | ENGLISH | G-Drive | Off | |

FIG.12

| | | | |
|---|---|---|---|
| 1205 | USER NAME | ICHIRO SUZUKI | SUZUKI |
| 1210 | COMPANY NAME/ DEPARTMENT | HOGE COMPANY HOGE DEPARTMENT | HOGE COMPANY HOGE DEPARTMENT |
| 1215 | JOB TITLE | MANAGER | MANAGER |
| 1220 | SUPERVISOR (APPROVER) | PRESIDENT | PRESIDENT |
| 1225 | WORK TERMINAL (PC/SMARTPHONE) | PC | SMARTPHONE |
| 1230 | NOTIFICATION SETTING (E-MAIL NOTIFICATION ON/OFF, NOTIFICATION FREQUENCY) | E-MAIL NOTIFICATION ON FREQUENCY: EVERY TIME | NOT NOTIFIED |
| 1235 | DISPLAY LANGUAGE | ENGLISH | JAPANESE |
| 1240 | FILE STORAGE DESTINATION | W-Folder | G-Drive |

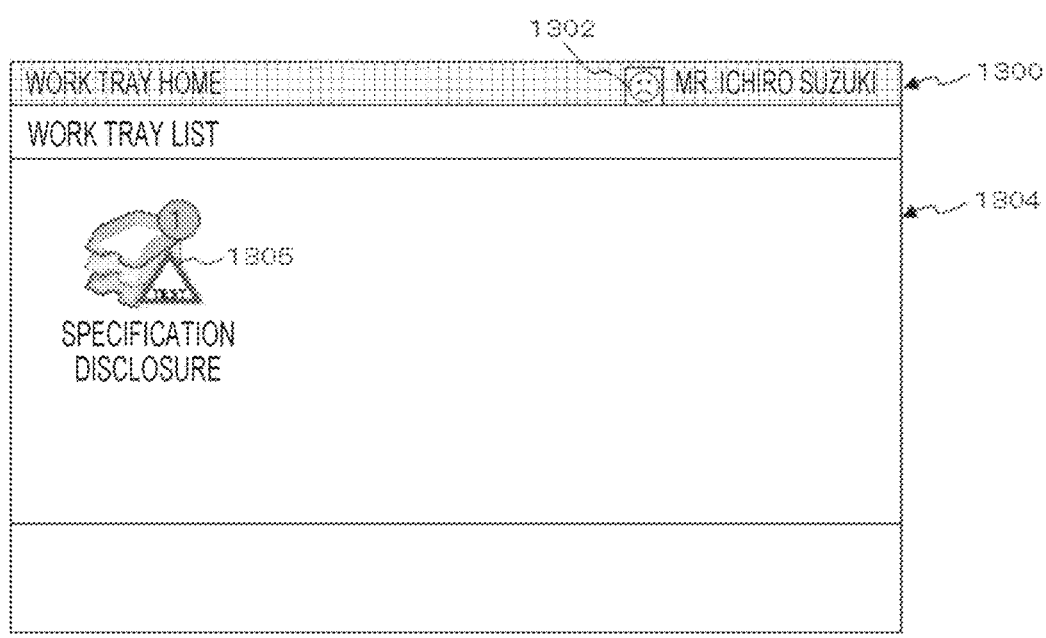

FIG.14
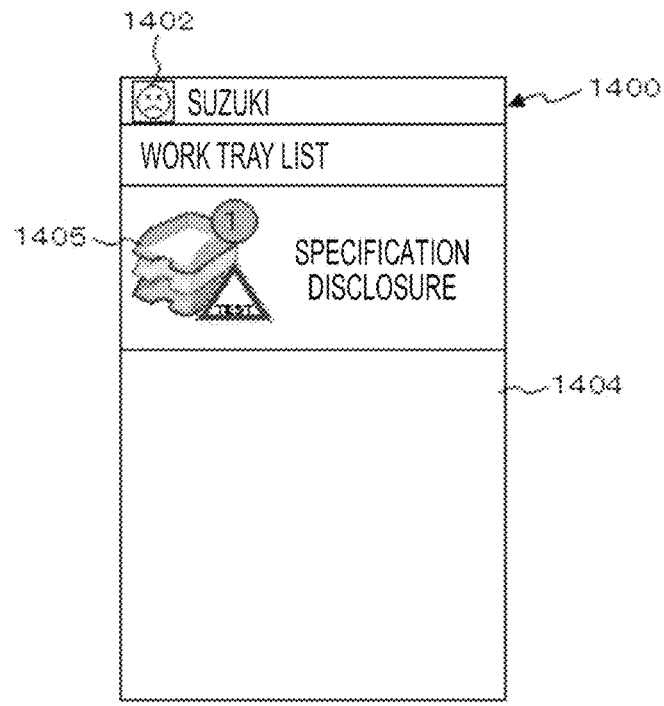
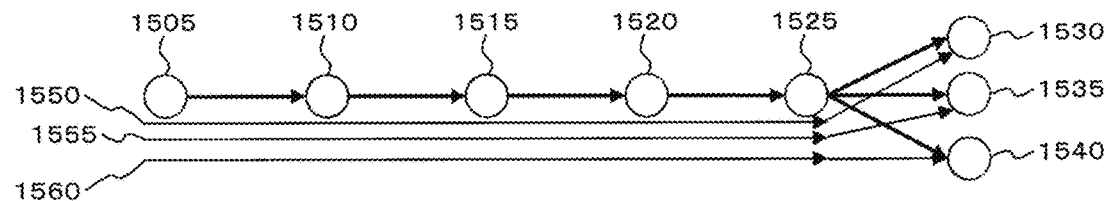
FIG.15A
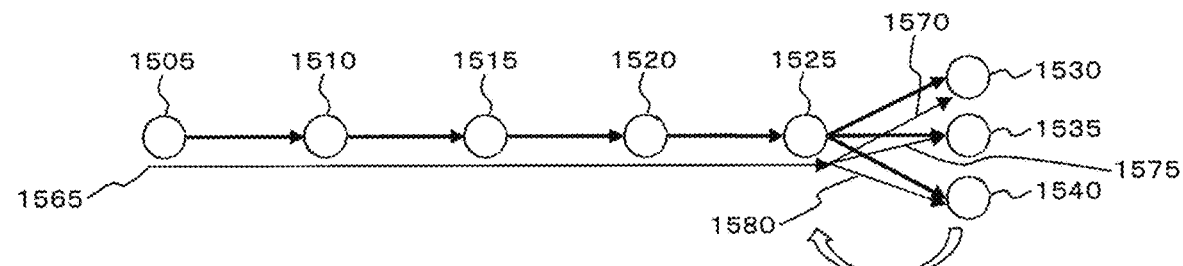
FIG.15B

FIG.16

| WORKFLOW ID | WORK STEP ID | WORK STEP NAME | NEXT WORK STEP ID |
|---|---|---|---|
| wf0001 | work0001 | START | work0002 |
| wf0001 | work0002 | APPLICATION | work0003 |
| wf0001 | work0003 | MANAGER'S APPROVAL | work0004 or work0005 |
| wf0001 | work0004 | PRESIDENT'S APPROVAL | work0005 |
| wf0001 | work0005 | END | Null |
| ... | | | |

FIG.17

| ID | DATE AND TIME | STATE ID | ACTIVE WORK STEP ID |
|---|---|---|---|
| 1 | 2018/01/29 1:00:00 | state0001 | work0002 |
| 2 | 2018/01/29 1:01:00 | state0002 | work0003 |
| 3 | 2018/01/29 1:02:00 | state0003 | work0004 |
| | | ... | |

FIG.18

| ID | STATE ID | WORK STEP ID | WORK STEP STATE DATA |
|---|---|---|---|
| 1 | state0001 | work0001 | [WORK STEP STATE DATA] |
| 2 | state0002 | work0001 | [WORK STEP STATE DATA] |
| 3 | state0002 | work0002 | [WORK STEP STATE DATA] |
| 4 | state0003 | work0001 | [WORK STEP STATE DATA] |
| 5 | state0003 | work0002 | [WORK STEP STATE DATA] |
| 6 | state0003 | work0003 | [WORK STEP STATE DATA] |
| ... | | | |

INFORMATION PROCESSING APPARATUS, WORKFLOW TEST APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-041655 filed Mar. 8, 2018 and Japanese Patent Application No. 2018-041656 filed Mar. 8, 2018.

BACKGROUND

(i) Technical Field

The present disclosure relates to an information processing apparatus, a workflow test apparatus, and a non-transitory computer readable medium.

(ii) Related Art

An object of JP-A-2008-041056 is to provide a software operation checking method, an information processing system and an information processing apparatus capable of easily and accurately simulating the operation of software implemented by plural software components. JP-A-2008-041056 discloses the software operation checking method for checking the operation of software on a predetermined apparatus on the information processing apparatus includes a receiving step of receiving, by the information processing apparatus, a request for simulating the operation of software implemented by plural software components, a simulating step of simulating, by the information processing apparatus, the operation of software on the predetermined device in units of software components constituting the software, and a responding step of outputting, by the information processing apparatus, the simulation result as a response to the simulation request. With this configuration, JP-A-2008-041056 achieves its object.

SUMMARY

There is a workflow that defines a series of business processing procedures. There is a need to test a newly created workflow (including modification or the like) before formally adopting the workflow.

However, in a workflow in which work is carried out by plural information processing apparatuses (or plural persons), in order to conduct a test, it is necessary to secure all the information processing apparatuses (or all the users who execute the work) in advance.

Aspects of non-limiting embodiments of the present disclosure relate to providing an information processing apparatus and a non-transitory computer readable medium capable of testing a workflow in which work steps are executed by plural information processing apparatuses (or plural persons), by one information processing apparatus (or one user).

In addition, a test of a workflow having a branch has plural execution patterns. Therefore, although these execution patterns have a common step, each test pattern has to be executed from the beginning, which takes much time for test.

Other aspects of non-limiting embodiments of the present disclosure relate to providing a workflow test apparatus and a non-transitory computer readable medium capable of testing a workflow from an instructed branch point in testing the workflow having a branch.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus for testing a workflow, the information processing apparatus including: an acquisition unit configured to acquire information about a first user who executes a first work step of the workflow; and a display unit configured to display a first simulation screen based on the information acquired by the acquisition unit, the first simulation screen simulating a first screen on which the first user executes the first work step of the workflow, wherein the display unit displays a second simulation screen, the second simulation screen simulating a second screen on which a second user executes a second work step of the workflow, the second work step of the workflow executed by the second user following the execution of the first work step by the first user on the first screen.

BRIEF DESCRIPTION OF THE DRAWINGS

Exemplary embodiment(s) of the present invention will be described in detail based on the following figures, wherein:

FIG. 4 illustrates an example of a data structure of a user basic data table;

FIG. 5 illustrates an example of a data structure of a user setting data table;

FIG. 12 illustrates an example of a data structure a user information table;

FIG. 13 illustrates a processing example according to the exemplary embodiment;

FIG. 14 illustrates a processing example according to the exemplary embodiment;

FIGS. 15A and 15B are explanatory diagrams illustrating examples of a workflow having a branch point as a target of the exemplary embodiment;

FIG. 16 illustrates an example of a data structure of a workflow definition table;

FIG. 17 illustrates an example of a data structure of a workflow state transition table;

FIG. 18 illustrates an example of a data structure of a workflow state data table;

DETAILED DESCRIPTION

Hereinafter, exemplary embodiments of the present disclosure will be described with reference to the accompanying drawings.

Figure 1:
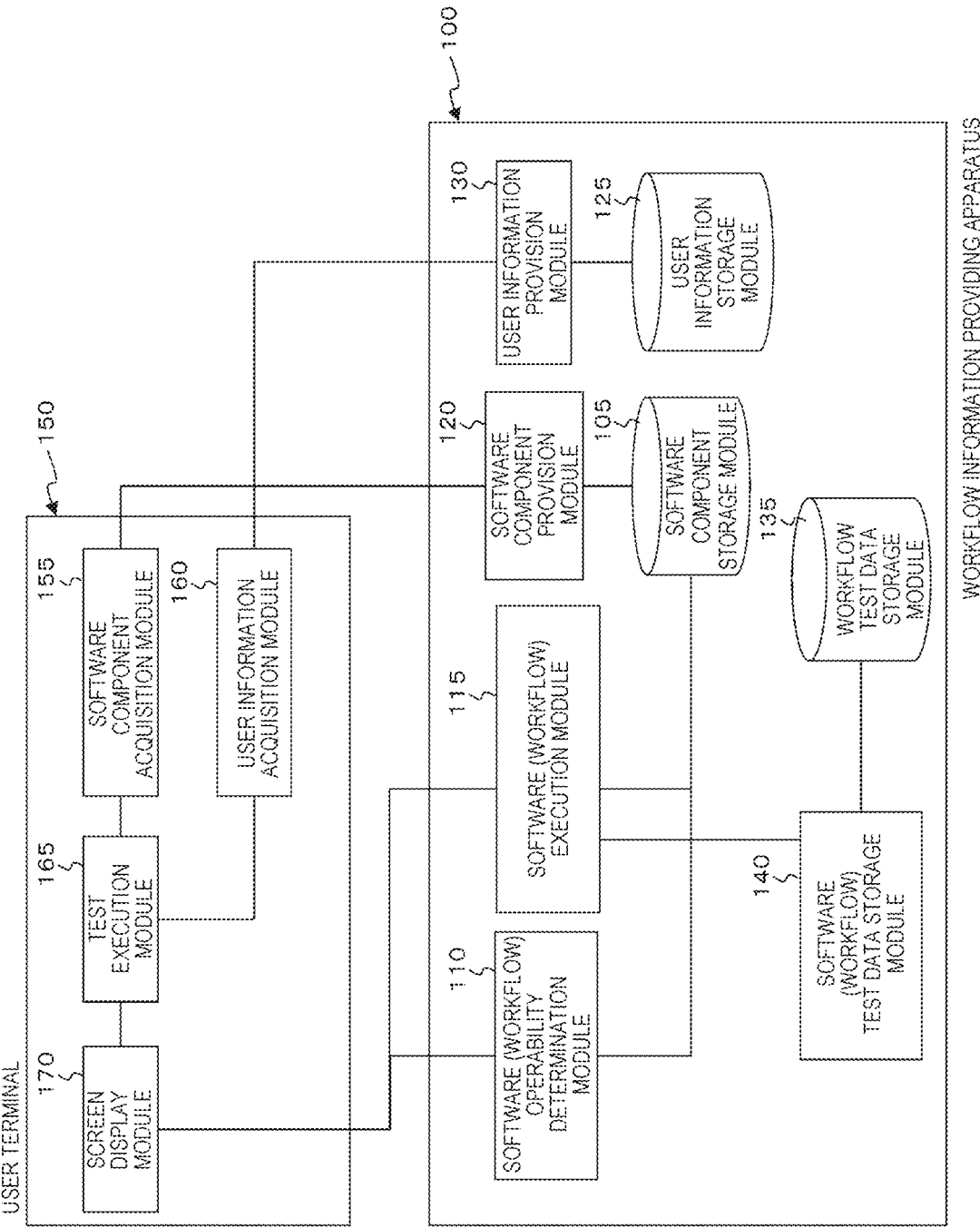
FIG. 1 is a conceptual module configuration diagram of a configuration example of an exemplary embodiment.

FIG. 1 is a conceptual module configuration diagram of a configuration example of an exemplary embodiment.

As used herein, the term "module" generally refers to a component such as software (computer program), hardware or the like that may be logically separated. Therefore, a module in this exemplary embodiment refers to not only a module for a computer program but also a module for a hardware configuration. Therefore, in this exemplary embodiment, a computer program for causing a computer to function as a module (a program for causing a computer to execute each procedure, a program for causing a computer to function as each unit, and a program for causing a computer to implement each function), a system and a method will be described. As used herein, the term "store", "stored" or an equivalent wording refers to storing a computer program in a storage device or causing a computer program to be stored in a storage device. In addition, although modules may be in the one-to-one correspondence with functions, in implementation, one module may be configured as one program, or plural modules may be configured as one program, or conversely, one module may be configured as plural programs. Further, plural modules may be executed by one computer, or one module may be executed by plural computers in a distributed or parallel environment. Further, one module may include other modules. As used herein, the term "connection" is intended to include not only a physical connection but also a logical connection (data exchange, instruction, reference relation between data, login, etc.). As used herein, the term "predetermined" refers to the point that an object is determined before a targeted process. Specifically, the term "predetermined" means that an object is determined not only before a process according to the present exemplary embodiment starts, but also before a process a targeted process after the process according to the present exemplary embodiment starts, according to the situation/state at that time or according to the situation/state so far. When there are plural "predetermined values", they may be different values or may be two or more identical values (including a case where all values are the same). In addition, a statement "when A is true, do B" is used to mean "determine whether A is true and do B when it is determined that A is true". It should be noted that cases where it is unnecessary to determine whether A is true are excluded. Further, when enumerating objects like "A, B, and C", etc., it is an example enumeration unless otherwise mentioned, including a cases where only one of them is selected (e.g., only A).

The term "system or apparatus (device)" is intended to include not only plural computers, hardware, apparatuses, devices and the like connected by a communication unit such as a network (including a one-to-one correspondence communication connection) or the like, but also a single computer, hardware and the like. Herein, the "apparatus (device)" and the "system" are used synonymously with each other. Of course, the "system" does not include things that are merely a social "structure" which is an artificial agreement (social system).

In addition, for each process by each module or for each process when multiple processes are performed in the module, target information is read from a storage device, the process is performed and then a result of process is written in the storage device. Therefore, the description about reading from the storage device before a process and writing to the storage device after the process may be omitted in some cases. The storage device used here may include a hard disk, a RAM (Random Access Memory), an external storage medium, a storage device via a communication line, a register in a CPU (Central Processing Unit), and the like.

A workflow information providing apparatus 100 and a user terminal 150 according to the exemplary embodiment are ones that test a workflow (including a job flow). As illustrated in the example of FIG. 1, the workflow information providing apparatus 100 includes a software component storage module 105, a software (workflow) operability determination module 110, a software (workflow) execution module 115, a software component provision module 120, a user information storage module 125, a user information provision module 130, a workflow test data storage module 135 and a software (workflow) test data storage module 140. The user terminal 150 includes a software component acquisition module 155, a user information acquisition module 160, a test execution module 165 and a screen display module 170. The workflow information providing apparatus 100 also functions as a server that provides and executes software components of a workflow. The user terminal 150 also has a function of generating a workflow.

"Workflow" defines a series of business processing procedures and also refers to a series of flows of the business. The workflow includes ordered work steps as illustrated in an example of FIGS. 3A to 3C to be described later. A document is transferred between work steps in the workflow. Here, the term "document (also referred to as a file)" is text data, numerical data, graphic data, image data, moving image data, sound data, a combination thereof, or other similar data. The documents (files) are subjected to storing, editing, and searching and may be exchanged in units of individuals between systems or users. More specifically, the document includes a document created by a document creation program (so-called word processor software), an image read by an image reading device (a scanner or the like), a Web page, and the like.

According to the present exemplary embodiment, a user (one tester) on the user terminal 150 acts as a first user and a second user to execute work steps on behalf of the first user and the second user.

In a case where the users has the user terminals 150 individually, it is possible to test a workflow with one user terminal 150 according to the present exemplary embodiment.

"Workflow test" includes verification, simulation and debugging. The workflow test is execution in a test mode and does not affect the formal operation.

The software component storage module 105 is connected to the software (workflow) operability determination module 110, the software (workflow) execution module 115 and the software component provision module 120. The software component storage module 105 stores software (program) related to a workflow. The software component storage module 105 stores, for example, software components that execute processes of respective work steps of the workflow. When a user terminal 150 used by the first user is different in type from a user terminal 150 used by the second user, it may be necessary to prepare different software even though the same process is executed. Of course, software written in a programming language independent of OS may be used.

The software (workflow) operability determination module 110 is connected to the software component storage module 105 and the screen display module 170 of the user terminal 150. The software (workflow) operability determination module 110 determines whether a target workflow can operate (run) on the user terminal 150. When the target workflow cannot operate, the software (workflow) operability determination module 110 notifies the user terminal 150 that the workflow cannot operate on the user terminal 150.

The software (workflow) execution module 115 is connected to the software component storage module 105, the software (workflow) test data storage module 140 and the screen display module 170 of the user terminal 150. The software (workflow) execution module 115 executes respective work steps of the workflow. The test execution module 165 may execute the respective work steps of the workflow in the test. Alternatively, in the test, each work step of the workflow may be executed according to an instruction from the test execution module 165.

The software component provision module 120 is connected to the software component storage module 105 and the software component acquisition module 155 of the user terminal 150. In accordance with a request from the software component acquisition module 155 of the user terminal 150, the software component provision module 120 extracts software from the software component storage module 105 which is necessary for the user terminal 150 to execute each work step of the workflow, and provides the extracted software to the user terminal 150.

The user information storage module 125 is connected to the user information provision module 130. The user information storage module 125 stores information on users who execute the respective work steps of the workflow (the first user, the second user, etc.). The user information storage module 125 stores, for example, a user basic data table 400, a user setting data table 500 and a notification destination setting table 600.

FIG. 4 illustrates an example of a data structure of the user basic data table 400. The user basic data table 400 has a user ID column 405, a name column 410, an e-mail address column 415, an organization column 420 and a job title column 425. In the present exemplary embodiment, the user ID column 405 stores information for uniquely identifying a user (user ID: IDentification). The name column 410 stores the name of the user. The e-mail address column 415 stores the e-mail address of the user. The organization column 420 stores an organization in which the user is. The job title column 425 stores the job title of the user. For example, in FIG. 4, in the user ID: User0001, the name is "Taro Fuji", the e-mail address is "fuji.taro@hoge.com", the organization is "Hoge department", and the job title is "general". In the user ID: User0002, the name is "Ichiro Suzuki", the e-mail address is "suzuki.ichiro@hoge.com", the organization is "Hoge department", and the job title is "manager".

FIG. 5 illustrates an example of a data structure of the user setting data table 500. The user setting data table 500 has a user ID column 505, a device ID column 510, a display language column 515, a file storage location column 520, an e-mail notification column 525 and an e-mail notification frequency column 530. The user ID column 505 stores a user ID. In the present exemplary embodiment, the device ID column 510 stores information for uniquely identifying a device (device ID). This device is a user terminal 150 used by the user of the user ID. The display language column 515 stores a display language of the user terminal 150. The file storage location column 520 stores a file storage location of the user terminal 150 (or the user). The e-mail notification column 525 stores On or Off of the e-mail notification function of the user terminal 150 (or the user). The e-mail notification frequency column 530 stores a frequency of the e-mail notification. For example, in FIG. 5, for the user ID: User0001, the device ID is "User0001-Desktop1", the display language is "English", the file storage location is "W-Folder", the e-mail notification is "On", and the e-mail notification frequency is "once a day". For the user ID: User0002, the device ID is "User0002-Mobile1", the display language is "Japanese", the file storage location is "G-Drive", the e-mail notification is "On", and the e-mail notification frequency is "every time". For the user ID: User0002, the device ID is "User0002-Desktop1", the display language is "English", the file storage location is "G-Drive", and the e-mail notification is "Off". The second row and the third row of the user setting data table 500 show that the same user (User0002) has two user terminals 150 (User0002-Mobile1 and User0002-Desktop1).

Figures 6, 7:
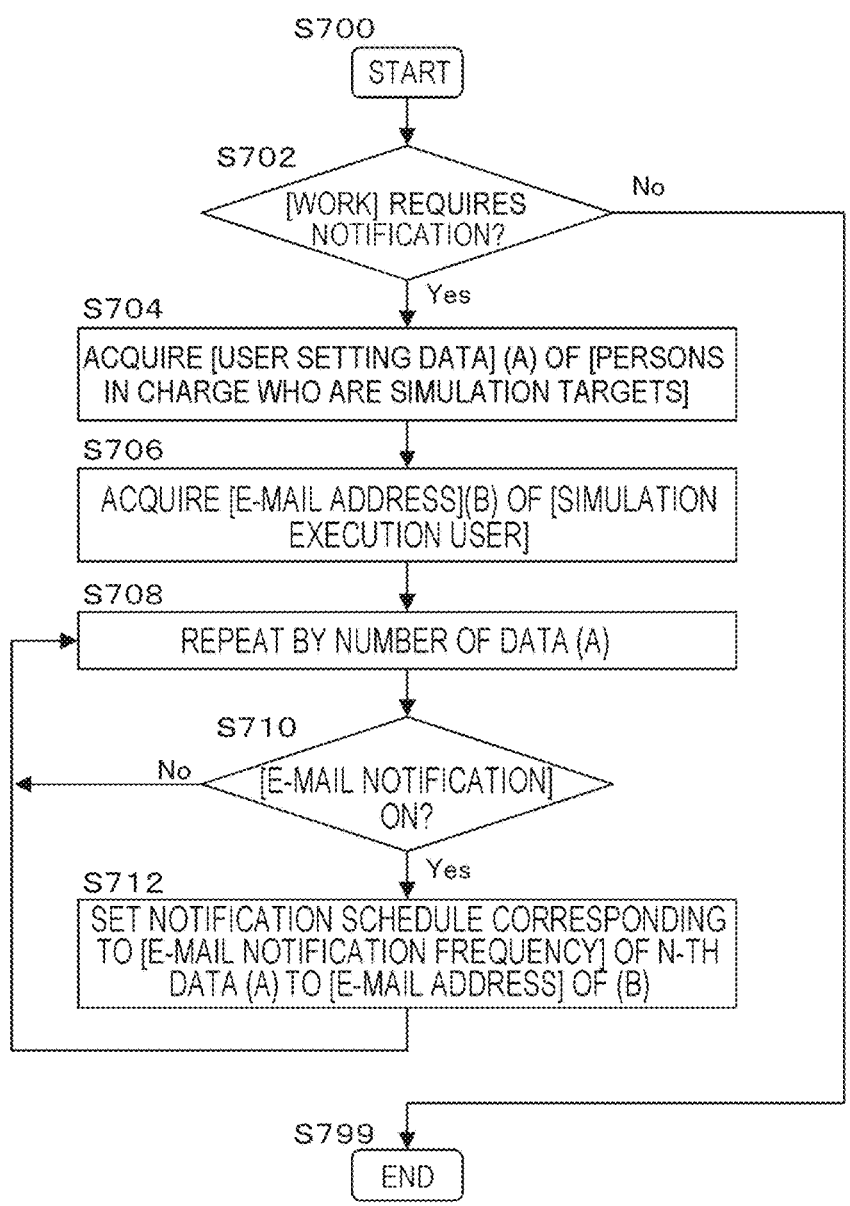
FIG. 6 illustrates an example of a data structure of a notification destination setting table.
FIG. 7 is a flowchart illustrating a processing example according to the exemplary embodiment.

FIG. 6 illustrates an example of a data structure of the notification destination setting table 600. The notification destination setting table 600 includes a workflow ID column 605, a work step ID column 610, an e-mail notification frequency column 615 and a notification destination column 620. In the present exemplary embodiment, the workflow ID column 605 stores information for uniquely identifying a workflow (workflow ID). In the present exemplary embodiment, the work step ID column 610 stores information for uniquely identifying a work step constituting the workflow (work step ID). The e-mail notification frequency column 615 stores the frequency of e-mail notifications in the workflow (or work step). The notification destination column 620 stores a notification destination of the e-mail.

The user information provision module 130 is connected to the user information storage module 125 and the user information acquisition module 160 of the user terminal 150. In accordance with a request from the user information acquisition module 160 of the user terminal 150, the user information provision module 130 extracts user information required for test from the user information storage module 125 and provides the extracted user information to the user information acquisition module 160. The user information provision module 130 provides user information that may be provided in a verification mode.

The software component acquisition module 155 is connected to the test execution module 165 and the software component provision module 120 of the workflow information providing apparatus 100. The software component acquisition module 155 acquires software required to execute a work step of the workflow from the software component provision module 120 of the workflow information providing apparatus 100.

The user information acquisition module 160 is connected to the test execution module 165 and the user information provision module 130 of the workflow information providing apparatus 100. The user information acquisition module 160 acquires information on users who executes work steps of the workflow from the user information provision module 130 of the workflow information providing apparatus 100. Specifically, the user information acquisition module 160 acquires information on the users who will be workers in the formal operation of the targeted workflow (the first user and the second user). More specifically, the information is information of the user in the user basic data table 400, the user setting data table 500 and the notification destination setting table 600.

The test execution module 165 is connected to the software component acquisition module 155, the user information acquisition module 160 and the screen display module 170. The test execution module 165 uses the software acquired by the software component acquisition module 155 and the information on the user acquired by the user information acquisition module 160 (the first user and the second user) to execute each work step of the targeted workflow on a trial basis. Specifically, the test execution module 165 executes respective work steps of the workflow as if the first user and the second user uses the respective work steps in the formal operation. For example, the test execution module 165 displays the names of the first user and the second user and performs a process such as displaying according to the type or specification of the user terminals 150 used by the first user and the second user.

The screen display module 170 is connected to the test execution module 165, the software (workflow) operability determination module 110 and the software (workflow) execution module 115 of the workflow information providing apparatus 100. The screen display module 170 reproduces and displays a screen corresponding to a user in charge of each work step using the user information.

For example, according to the user information acquired by the user information acquisition module 160, the screen display module 170 displays a screen for the first user who executes the work step of the workflow.

Then, when the work step to be executed by the first user on the display screen is completed, the screen display module 170 displays a screen for the second user who executes the next work step.

At least one of the first user or the second user is different from a user who tests the workflow. Of course, the first user and the second user are different users. As described above, the workflow test here is executed by one user (tester). The tester may be one of plural users in the formal operation (so-called production environment). Therefore, the tester is different from at least one of the first user or the second user.

At least one of the user terminal 150 used by the first user or the user terminal 150 used by the second user is different from the user terminal 150 that tests the workflow. Of course, the user terminal 150 used by the first user and the user terminal 150 used by the second user are different from each other. As described above, the workflow test here is executed by one user terminal 150. The tester may use one user terminal 150 among plural user terminals 150 in the formal operation (so-called production environment). Therefore, the user terminal 150 used for the test is different from at least one of the user terminal 150 used by the first user or the user terminal 150 used by the second user.

In addition, the screen display module 170 may reflect and display a setting value of the first user or the second user. The "setting value" here may be a type or specification of the user terminal 150 used by the first user or the user terminal 150 used by the second user. Further, the "setting value" may include a user attribute (such as a use language, a notation of a name (e.g., an English notation being different from a Japanese notation or having a middle name)).

The "type of the user terminal 150" includes, for example, a type of hardware such as a desktop personal computer and a mobile terminal, and a type of an operating system (OS) operating on the hardware. If the user terminals 150 are of different types, the user terminals 150 may be different in character type that the user terminals 150 can display (e.g., only alphabets can be displayed or Chinese characters can also be displayed, etc.), operability, use environment (e.g., indoor if a user terminal 150 is a desktop personal computer, outdoor where there are people around a user terminal 150 if the user terminal 150 is a mobile terminal, etc.). Further, the "specification of the user terminal 150" may include, for example, a screen size, a usable user interface, and the like. This is because different specifications may have different amounts of information that can be displayed, different operability of the workflow (ease of use, user-friendly), and the like. The "usable user interface" includes a mouse, a keyboard, a touch panel, a voice, a gaze, a gesture, and the like. The "specification of the user terminal 150" may be interpreted to include "the type of the user terminal 150".

Further, while the test is being executed, the screen display module 170 may display a process of the workflow together. Here, "together" means that an operation screen, a display screen or the like is displayed "together" with the process of the workflow in the workflow test. Here, as the "process of workflow", a current work step in the workflow may be displayed differently from other work steps. Here, "displaying a current work step differently from other work steps" may include displaying a current work step in a different form. Examples of the form include letters, figures, symbols, patterns, shapes, colors, dynamically changing (e.g., flash and animation), flickering (e.g., a change target in flickering includes the presence or absence of flickering, the duration of flickering, and an interval of flickering), and a combination thereof. Specifically, this may include displaying the current work step in red while displaying the background of other work steps in white, making a flickering display for the current work step while making a stationary display for the other work steps, or the like.

Further, the screen display module 170 may change the screen according to the contents of the test. Here, the "contents of the test" include work steps of the workflow, for example, application, approval, etc. Specifically, an application work screen and an approval work screen are made different.

Further, the screen display module 170 may be configured to set the first user or the second user. At the time of this test, this deals with a case where the first user or the second user is not determined (a case where a user in the formal operation is not determined). This setting may be made by the operation of the tester or a predetermined user may be set.

Next, modules in a case of testing a workflow with a branch will be described. In particular, exhaustive testing is supported in the workflow test.

The test execution module 165 and the screen display module 170 of the user terminal 150 execute the following processes in addition to the above-described processes.

The test execution module 165 acquires a workflow to be tested.

Then, the test execution module 165 receives an instruction of a branch point in the workflow. The instruction may be given an operation by a user, or the test execution module 165 may extract a branch point and instruct the extracted branch point.

Next, the test execution module 165 executes the workflow from the received branch point.

The screen display module 170 displays a process of the workflow while the test is being executed. As described above, as the "process of the workflow", a current work step in the workflow may be displayed differently from other work steps.

Further, the screen display module 170 may display a state of a document at each step in the workflow.

Furthermore, the screen display module 170 may display the contents of a process in each step and the screen displayed in that step.

Here, examples of the "branch point" may include (1) a step having plural next steps (a step branching on the work flow) and (2) a step at which different contents are displayed depending on a device executing a work step in the workflow. The step (2) may not be clearly distinguished only by the appearance of the workflow. Here, examples of the "step at which different contents are displayed depending on a device executing a work step" may include a step at which there are plural devices used by a user who works. Specifically, when a desktop personal computer or a mobile terminal has been set as a device on which the work step may be executed, it is necessary to test the work step in a case where the work step is executed by the desktop personal computer and the work step in a case where the work step is executed by the mobile terminal. Specifically, since the desktop personal computer and the mobile terminal have different screen sizes, the desktop personal computer and the mobile terminal are different in contents that can be displayed and user's operability. Therefore, the test is needed.

In this case, the screen display module 170 may display a step as a branch point differently from the other steps. Here, the "step at which different contents are displayed depending on a device executing a work step in the work flow" may not be determined by merely looking at the workflow. Specifically, the form of the step at which there are plural apparatuses that the user who executes a work step may be different from those of the other steps. Examples of the form of the step may include letters, figures, symbols, patterns, shapes, colors, dynamically changing ones (e.g., flash, animation, etc.), flickering (a change target in flickering includes the presence or absence of flickering, the duration of flickering, an interval of flickering, etc.), and a combination thereof. Specifically, this may include (i) displaying the step in which there are plural devices used by the user in red while displaying the background of other steps in white, (ii) making a flickering display for the step in which there are plural devices used by the user while making a stationary display for the other steps, or the like.

The "branch point" may be a step having different routes depending on the determination of work in the workflow. Here, the "different routes" means that a branch occurs on the appearance of the workflow.

The software (workflow) test data storage module 140 is connected to the software (workflow) execution module 115 and the workflow test data storage module 135. The software (workflow) test data storage module 140 supplies test data for executing the workflow test to the test execution module 165 or the software (workflow) execution module 115 that tests the workflow.

Then, the software (workflow) test data storage module 140 extracts log data (history data) of the workflow test executed by the test execution module 165 or the software (workflow) execution module 115, and stores the extracted log data in the workflow test data storage module 135. The log data here includes the state of a document at each of the steps, the process contents at each step, the screen displayed at each step, and the like.

The workflow test data storage module 135 is connected to the software (workflow) test data storage module 140. The workflow test data storage module 135 stores test data for executing the workflow test. Examples of the test data include a document or the like used in a test. The test data includes log data in the test. For example, the workflow test data storage module 135 stores a workflow definition table 1600, a workflow state transition table 1700 and a workflow state data table 1800.

FIG. 16 illustrates an example of a data structure of the workflow definition table 1600. The workflow definition table 1600 has a workflow ID column 1605, a work step ID column 1610, a work step name column 1615 and a next work step ID column 1620. The workflow ID column 1605 stores a workflow ID. The work step ID column 1610 stores a work step ID of a work step constituting the workflow. The work step name column 1615 stores a work step name of a work step. The next work step ID column 1620 stores a work step ID of a next work step. For a work step having a branch, plural work step IDs are stored as illustrated in the third row of the workflow definition table 1600 of FIG. 16.

FIG. 17 illustrates an example of a data structure of the workflow state transition table 1700.

The workflow state transition table 1700 has an ID column 1705, a date and time column 1710, a state ID column 1715 and an active work step ID column 1720. The ID column 1705 stores an ID. The date and time column 1710 stores date and time at which a work step in the test is executed. In the present exemplary embodiment, the state ID column 1715 stores information for uniquely identifying a state (state ID). The active work step ID column 1720 stores a work step ID of the work step executed (made active) at the date and time.

FIG. 18 illustrates an example of a data structure of the workflow state data table 1800.

The workflow state data table 1800 has an ID column 1805, a state ID column 1810, a work step ID column 1815 and a work step state data column 1820. The ID column 1805 stores an ID. The state ID column 1810 stores a state ID. The state ID column 1810 corresponds to the state ID column 1715 of the workflow state transition table 1700. The work step ID column 1815 stores a work step ID. The work step ID column 1815 corresponds to the work step ID column 1610 of the workflow definition table 1600. The work step state data column 1820 stores work step state data. Specifically, the work step state data column 1820 stores the contents of a process executed in the work step (so-called log data).

Figure 2:
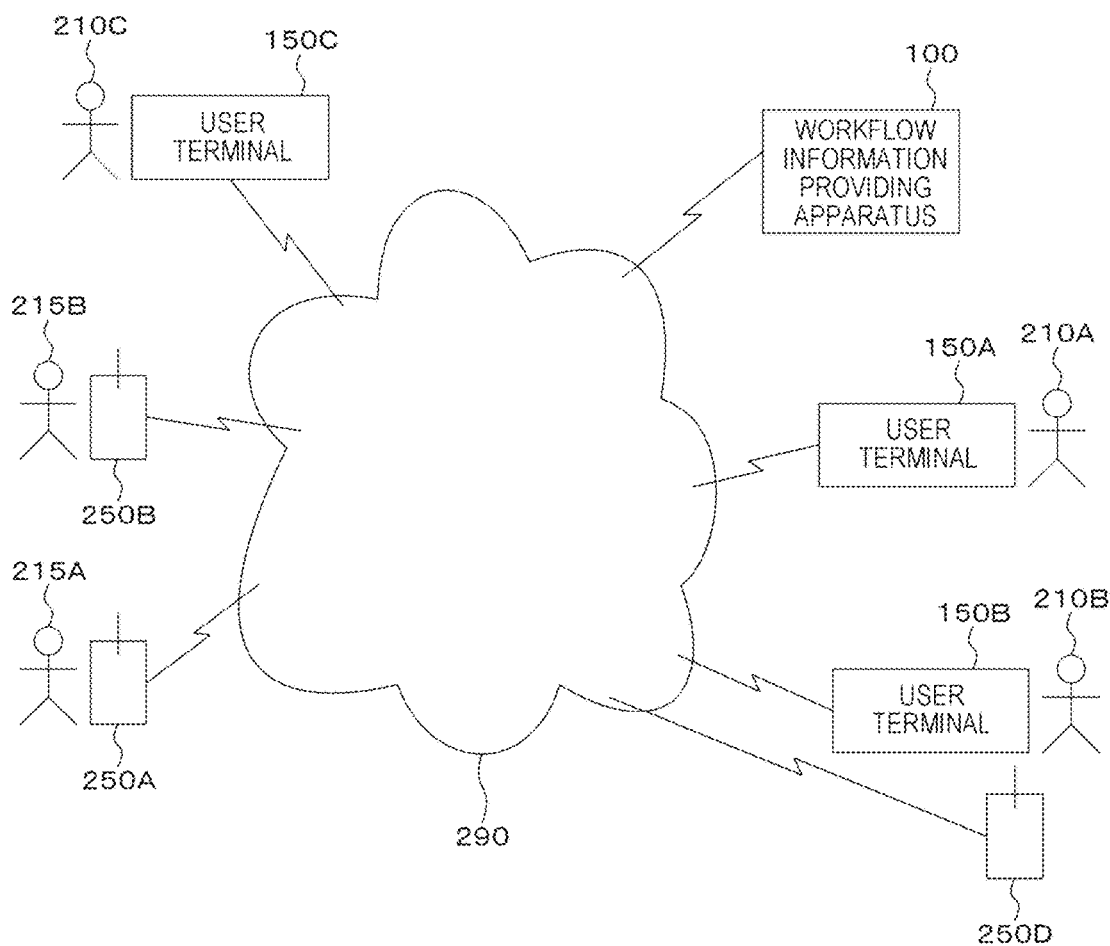
FIG. 2 is an explanatory diagram illustrating a system configuration example using the exemplary embodiment.

FIG. 2 is an explanatory diagram illustrating a system configuration example using the present exemplary embodiment.

The workflow information providing apparatus 100, a user terminal 150A, a user terminal 150B, a user terminal 150C, a user mobile terminal 250A, a user mobile terminal 250B and a user mobile terminal 250D are connected via a communication line 290. The user mobile terminal 250 is an example of the user terminal 150 illustrated in the example of FIG. 1. The communication line 290 may be wireless, wired, or a combination thereof, and may be, for example, the Internet, an intranet as an infrastructure for communication, or the like. Further, functions of the workflow information providing apparatus 100 may be implemented as a cloud service. A user 210 is a worker of the workflow and is an example of the first user and the second user.

A user 210A and a user 210C have the user terminal 150A and the user terminal 150C, respectively.

A user 215A and a user 215B have the user mobile terminal 250A and the user mobile terminal 250B, respectively.

A user 210B has the user terminal 150B and the user mobile terminal 250D.

In the present exemplary embodiment, for example, when the user 210A is a tester of the workflow and tests the workflow at the user terminal 150A, the user 210A may execute a work step, which is to be executed by the user 210B or the like in the formal operation, on the user terminal 150A. In addition, it is also possible to display on the user terminal 150A a screen equivalent to the screen displayed on the user mobile terminal 250D.

First Processing Example

Figure 3A:
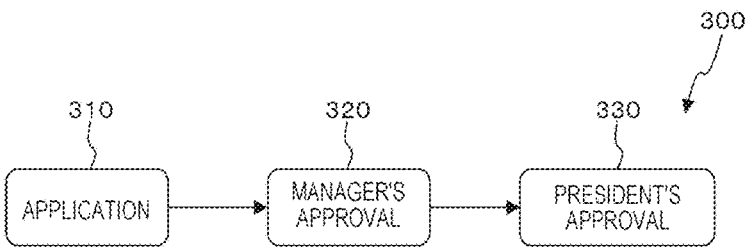
FIGS. 3A to 3C are explanatory diagrams illustrating an example of a workflow to be processed in the exemplary embodiment.
Figure 3B:
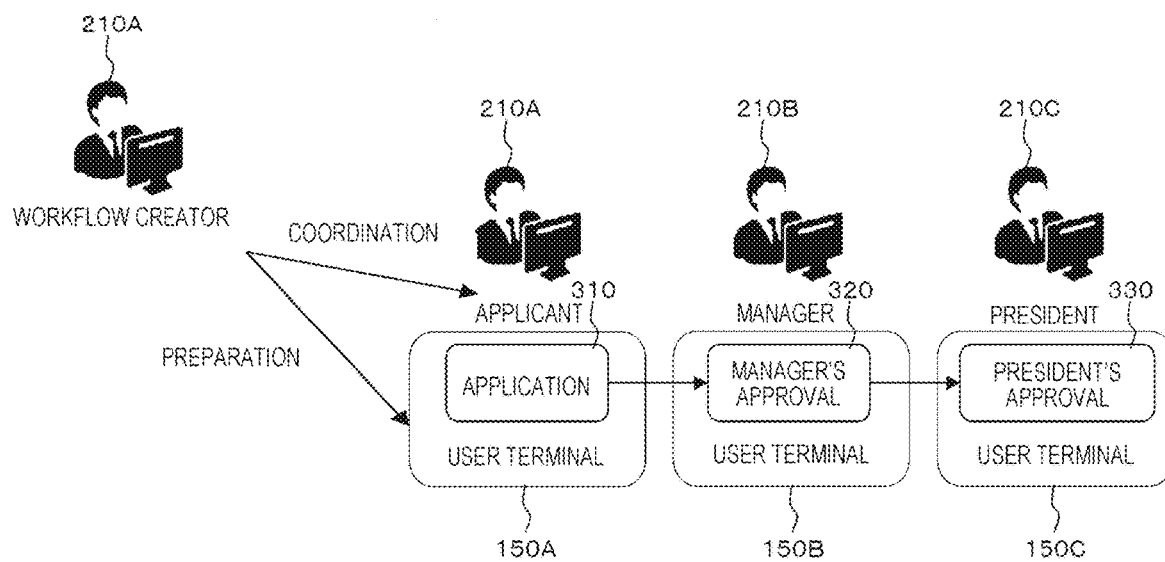
Figure 3C:
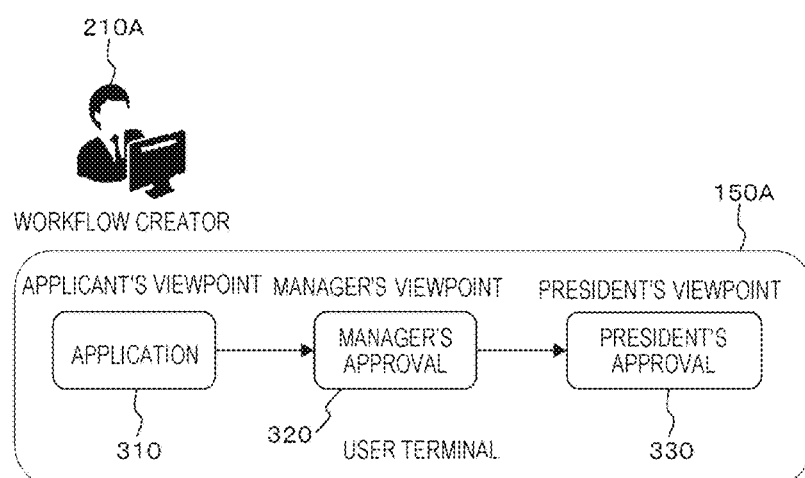

FIGS. 3A to 3C are explanatory diagrams illustrating an example of a workflow to be processed in the exemplary embodiment.

As illustrated in the example of FIG. 3A, a workflow 300 includes work steps of an application 310, a manager's approval 320, and a president's approval 330. The manager's approval 320 is performed after the application 310. The president's approval 330 is performed after the manager's approval 320. In this workflow, plural users (e.g., plural user terminals 150) intervene as workers.

As illustrated in the example of FIG. 3B, the respective work steps of this workflow 300 are assigned to the users.

The user 210A is a workflow creator and is also an applicant as a worker of the application 310 in the workflow 300. Then, the work step is executed using the user terminal 150A.

The user 210B is a manager as a worker of the manager's approval 320 in the workflow 300. Then, the work step is executed using the user terminal 150B. This work may be executed using the user mobile terminal 250D or the like.

The user 210C is a president as a worker of the president's approval 330 in the workflow 300. Then, the work step is executed using the user terminal 150C.

In a case of testing the workflow 300 without using this exemplary embodiment, it is necessary to coordinate the schedules of the user 210A, the user 210B and the user 210C, and make preparation (e.g., environment maintenance for executing the workflow 300) of the user terminal 150B or the like.

A illustrated in the example of FIG. 3C, this exemplary embodiment allows the user 210A, who created the workflow 300, to test the workflow 300 before putting the workflow into actual operation. That is, the work steps of the application 310, the manager's approval 320 and the president's approval 330 are simulated on the user terminal 150A. During the simulation, the user 210A may simulate the work step of application 310 from the applicant's point of view, the work step of manager's approval 320 from the manager's point of view, and the work step of president's approval 330 from the president's point of view. In other words, a single user terminal (user terminal 150A) may display what the actual users would see on their respective screens in an actual (non-testing) environment, allowing the user 210A to test the workflow 300 alone (that is, without the help of the user 210B and the user 210C).

FIG. 7 is a flowchart illustrating a processing example according to the exemplary embodiment. This processing example illustrates a processing example in a test mode and is a process of changing a notification destination to a tester.

In step S702, it is determined whether the work step is a work step requiring notification. When the work step is the work step requiring notification, the process proceeds to step S704. Otherwise, the process ends (step S799). Examples of the notification include an e-mail, a chat, an electronic bulletin board, a notification using social media, a push notification, and a telephone call by an automatic voice reply. The telephone call may be made using, for example, Lync (registered trademark). In the following description, an e-mail will be used.

In step S704, user setting data (hereinafter, denoted by (A) in this flowchart) of persons in charge who are simulation targets (users in the formal operation) is acquired. For example, the user setting data of the persons in charge may be acquired from the user setting data table 500.

In step S706, an e-mail address (hereinafter, denoted by (B) in this flowchart) of a simulation execution user (tester) is acquired. For example, an e-mail address of the executing user may be acquired from the e-mail address column 415 of the user basic data table 400.

In step S708, the process up to step S712 is repeated by the number of data (A).

In step S710, it is determined whether the e-mail notification function (the e-mail notification column 525 of the user setting data table 500) is On. When it is determined that the e-mail notification function is On, the process proceeds to step S712. Otherwise, the process returns to step S708.

In step S712, a notification schedule corresponding to the e-mail notification frequency of the N-th data (A) (the e-mail notification frequency column 530 of the user setting data table 500) is set to the e-mail address (B) and the process returns to step S708.

Figure 8:
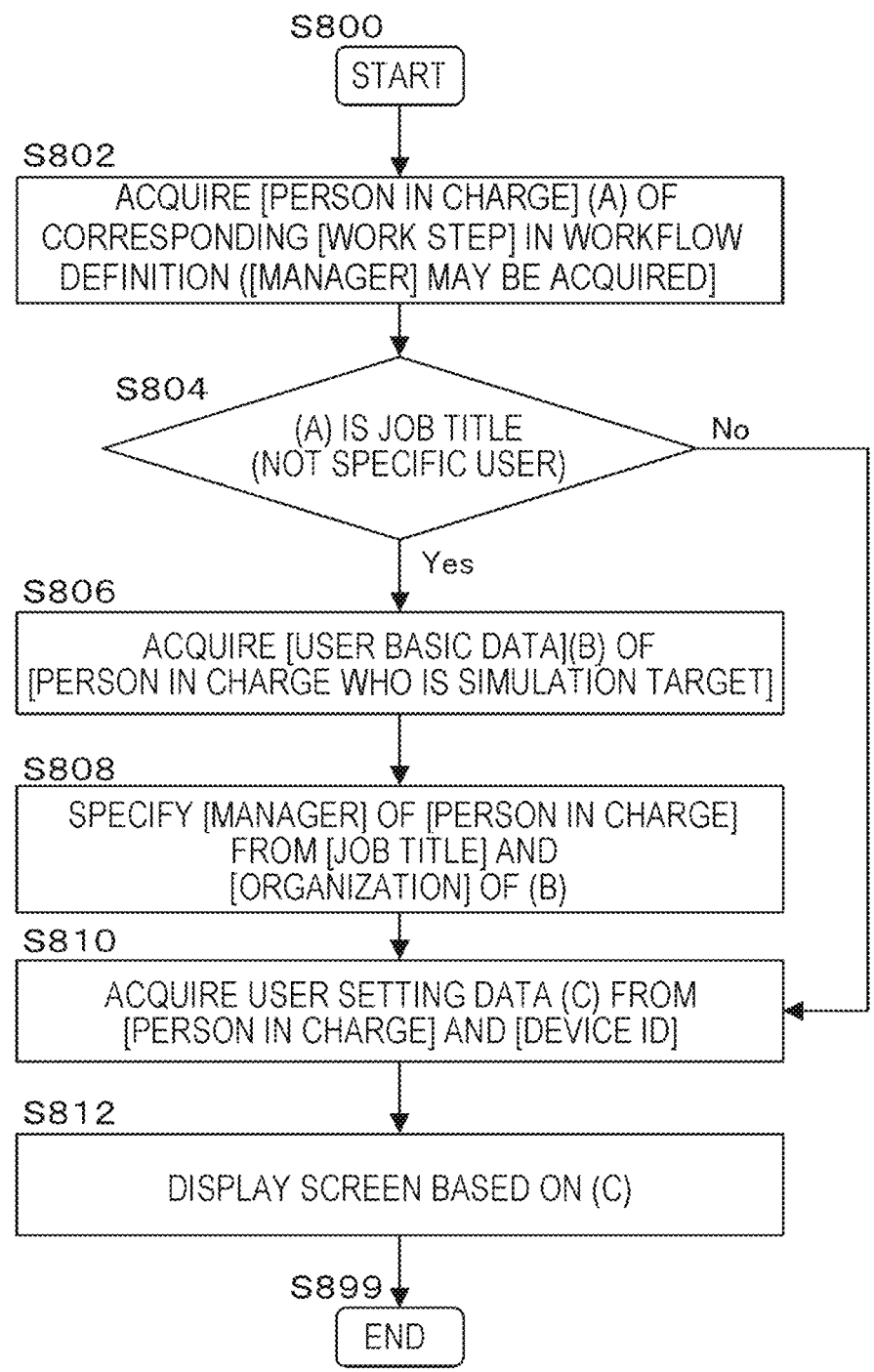
FIG. 8 is a flowchart illustrating a processing example according to the exemplary embodiment.

FIG. 8 is a flowchart illustrating a processing example according to the exemplary embodiment. This processing example illustrates a processing example in a test mode and is a process of displaying a screen.

In step S802, a person in charge of a corresponding work step in the workflow definition (hereinafter, denoted by (A) in this flowchart) is acquired. For example, in step S802, [manager] may be acquired.

In step S804, it is determined whether (A) is a job title. When it is determined that (A) is a job title, the process proceeds to step S806 and then to step S810. In the workflow definition, it is possible to designate a worker by a "specific user" (specified by a user ID) or a "job title". The determination as to whether (A) is a job title is also a determination as to whether (A) is a specific user.

In step S806, user basic data (hereinafter, denoted by (B) in this flowchart) of the person in charge who is the simulation target is acquired. For example, the user basic data table 400 is acquired.

In step S808, [manager] of the person in charge is specified based on the job title and the organization (the job title column 425 and the organization column 420 of the user basic data table 400) of (B). For example, a manager who is in the same organization as the tester (or a worker of the previous work step) may be extracted.

In step S810, user setting data (hereinafter, denoted by (C) in this flowchart) is acquired from the person in charge and a device ID. For example, the user setting data table 500 is acquired. Here, the device ID is designated by the operation of the tester. For example, a mobile terminal is designated.

In step S812, a screen is displayed based on (C). For example, a test is executed based on the data of the second row of the user setting data table 500.

A specific example of the process illustrated in the example of FIG. 8 will be described with reference to examples of FIGS. 9 to 14.

It is assumed that a mode is the test mode and that the simulation execution user: Taro Fuji, the person in charge who is the simulation target: Ichiro Suzuki (manager), and display terminal: mobile terminal (User0002-Mobile1).

Figure 9:
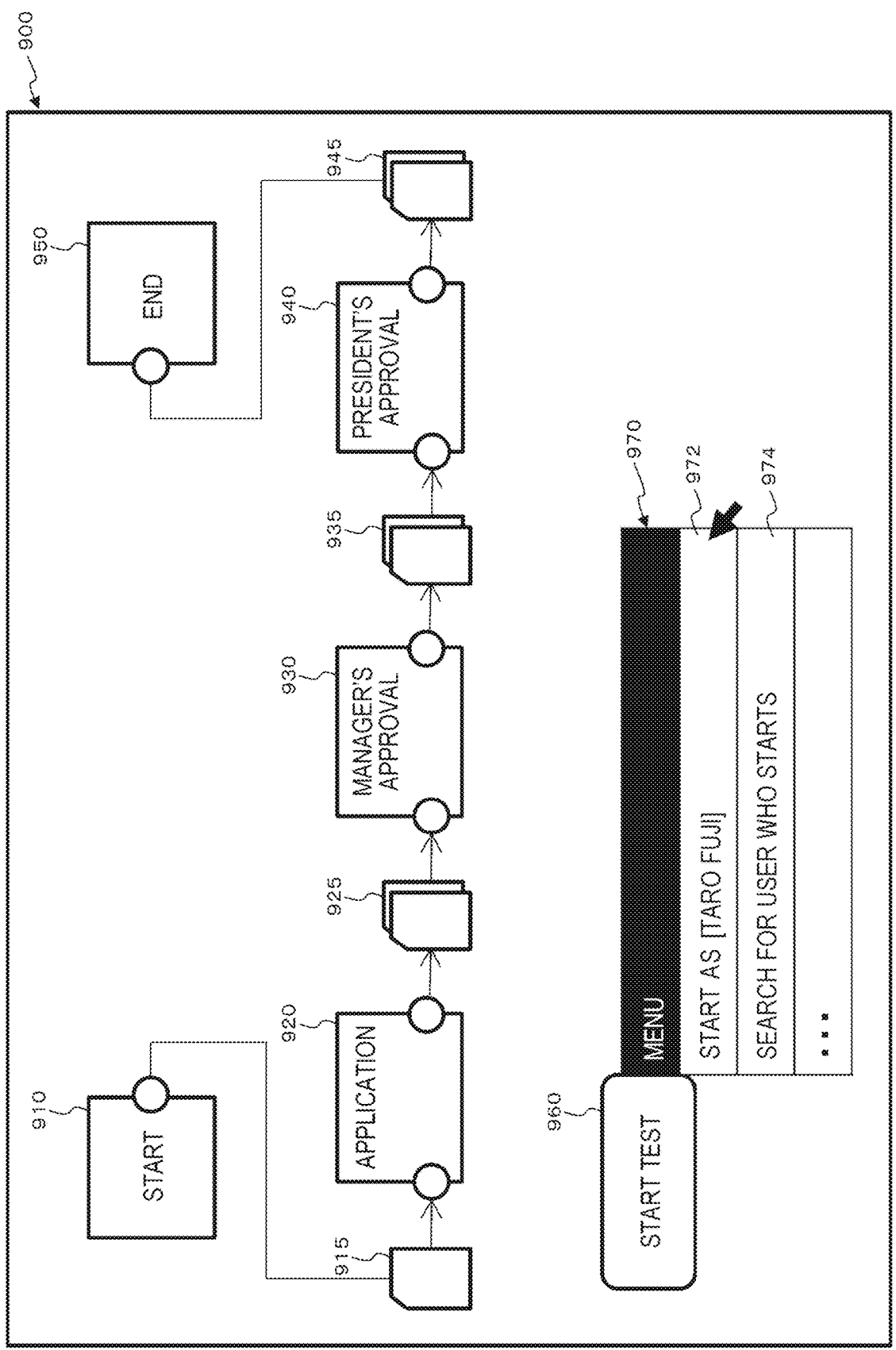
FIG. 9 illustrates a processing example according to the exemplary embodiment.

FIG. 9 illustrates a processing example according to the exemplary embodiment.

A screen 900 displays, as a workflow, a start 910, a document 915, an application 920, a document 925, a manager's approval 930, a document 935, a president's approval 940, a document 945 and an end 950. The screen 900 further displays a test start button 960. Then, when an operation of selecting the test start button 960 by the tester (Taro Fuji) is detected, a menu 970 is displayed. In the menu 970, for example, "start as [Taro Fuji]" (972) and "search for a user to start" (974) are displayed. "Taro Fuji" in "start as [Taro Fuji]" (972) is the user of the user terminal 150 that displays the screen 900. Here, it is assumed that "start as [Taro Fuji]" (972) is selected.

Figure 10:
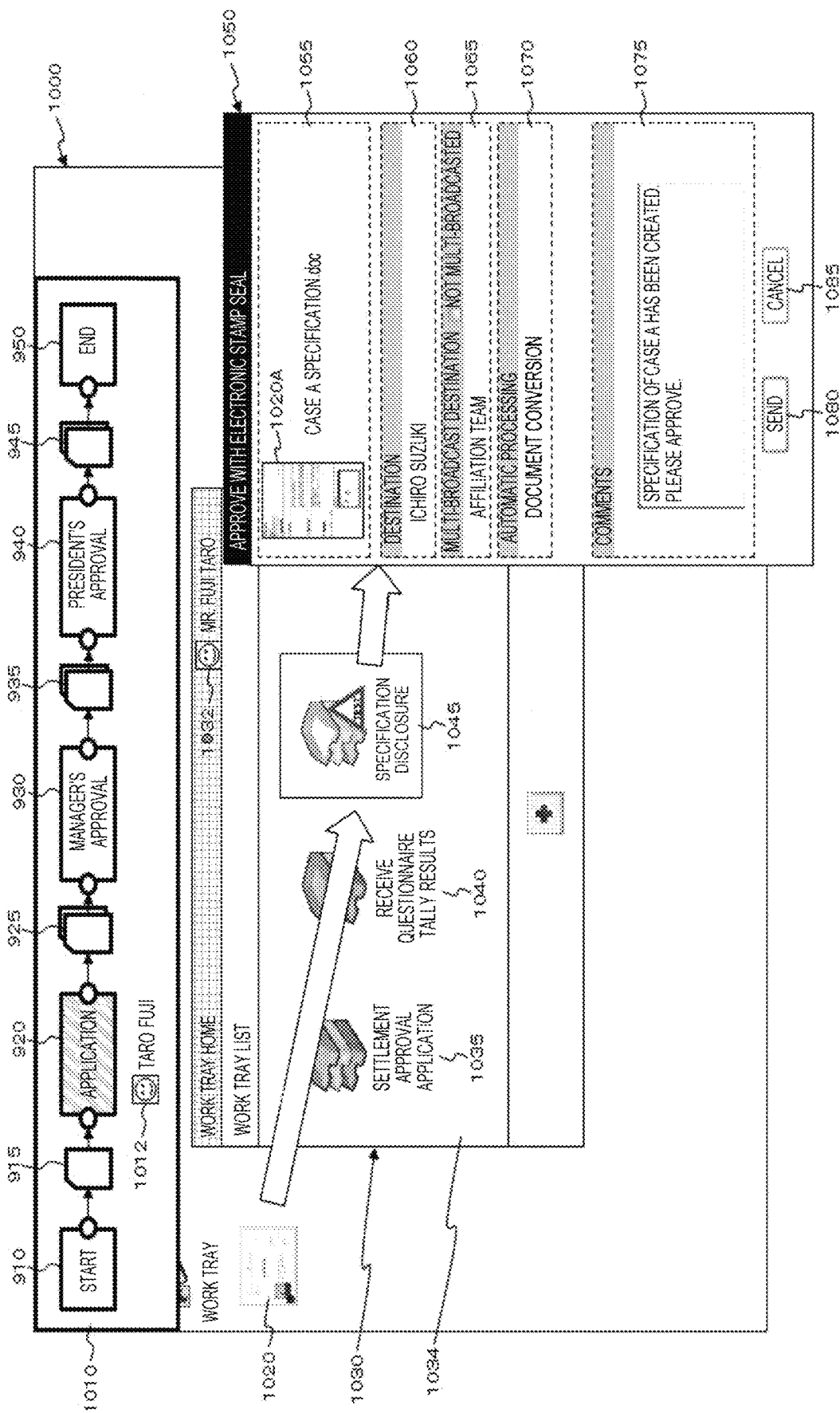
FIG. 10 illustrates a processing example according to the exemplary embodiment.

FIG. 10 illustrates a processing example according to the exemplary embodiment. This processing example illustrates a test example of the work of application 920.

A screen 1000 displays a workflow display area 1010, a document 1020, a work tray display area 1030 and an application 1050.

In the workflow display area 1010, the workflow (the start 910 to the end 950) and a worker display field 1012 are displayed. The application 920 being worked is displayed in a form different from other work steps (the manager's approval 930, etc.) (e.g., the application 920 is displayed in yellow). In addition, the worker display field 1012 is displayed under the application 920 being worked. This application 920 and the worker display field 1012 make it possible to know which work step in the workflow definition is being tested by which user.

In the application 920, the work tray display area 1030 is displayed. In the work tray display area 1030, a worker display field 1032 and a work tray list display area 1034 are displayed. In the work tray list display area 1034, a "settlement approval application" tray 1035, a "receive questionnaire tally results" tray 1040, a "specification disclosure" tray 1045 and the like are displayed. As work in the application 920, the tester performs an operation to copy (or move) the document 1020 to the "specification disclosure" tray 1045. In response to this operation, the application 1050 is displayed. In the application 1050, a target document display area 1055, a destination display area 1060, a multi-broadcast address display area 1065, an automatic processing display area 1070, a comment display area 1075, a submit button 1080 and a cancel button 1085 are displayed. A document 1020A displayed in the target document display area 1055 is a thumbnail image of the copied document 1020.

When the tester selects the submit button 1080, the work of the application 920 is completed. Then, the process proceeds to the work of the next manager's approval 930.

The work tray display area 1030 and the application 1050 are equivalent to those displayed on the user terminal 150 of Taro Fuji.

Figure 11:
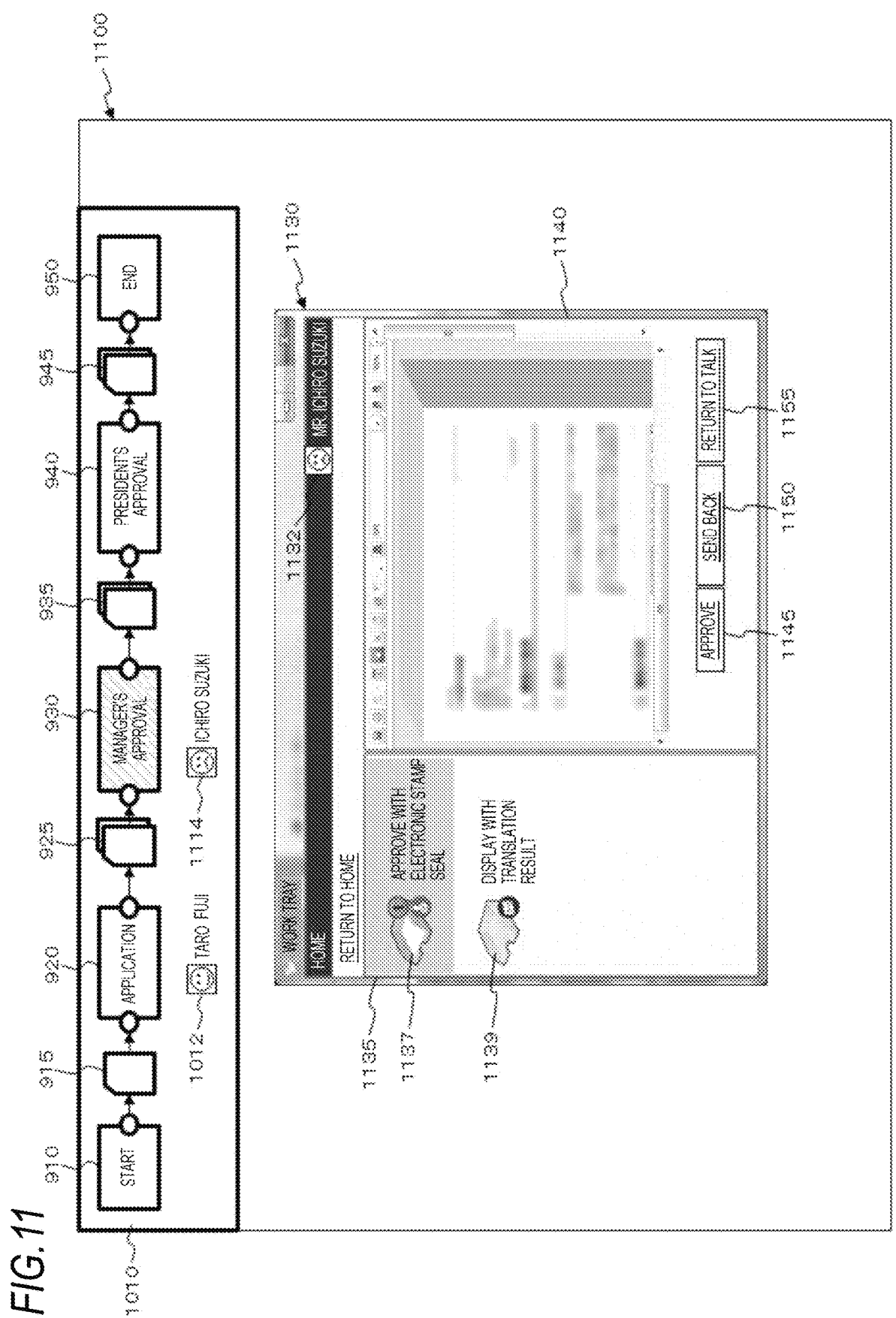
FIG. 11 illustrates a processing example according to the exemplary embodiment.

FIG. 11 illustrates a processing example according to the exemplary embodiment. This processing example illustrates an example of test of the work of manager's approval 930.

On a screen 1100, a workflow display area 1010 and a work tray display area 1130 are displayed.

In the workflow display area 1010, the workflow (the start 910 to the end 950), the worker display field 1012 and a worker display field 1114 are displayed. The manager's approval 930 being worked is displayed in a form different from other work steps (the application 920, etc.) (e.g., the manager's approval 930 is displayed in yellow). In addition, the worker display field 1114 is displayed under the manager's approval 930 being worked. The manager's approval 930 and the worker display field 1114 make it possible to know which work step in the workflow definition is being tested by which user. The person in charge of each work step may be fixed or may be changed dynamically according to the contents of an application and an applicant. The person in charge is determined based on a work step, and the work step is verified from the viewpoint of the person in charge.

In the manager's approval 930, the work tray display area 1130 is displayed. In the work tray display area 1130, a worker display field 1132, a work tray list display area 1135 and a document display area 1140 are displayed. In the work tray list display area 1135, an "approve with electronic seal stamp" tray 1137 and a "display with translation result" tray 1139 are displayed. The fact that a target document (the document 1020 in FIG. 10) is stored in the "approve with electronic seal stamp" tray 1137 is indicated by a "circle mark 1" on the upper right of the "approve with electronic seal stamp" tray 1137. The tester selects the "approve with electronic seal stamp" tray 1137 to display the target document in the document display area 1140. Also, an "approve" button 1145, a "send back" button 1150 and a "return to talk" button 1155 as work on the document are displayed.

The work tray display area 1130 is equivalent to that displayed by the user terminal 150 of Ichiro Suzuki.

In addition, the screens in FIGS. 10 and 11 (screens displayed in the work being tested) are not displayed on the user terminals 150 of users other than the tester (Ichiro Suzuki, etc.). In other words, users other than the tester are not disturbed (not bothered).

In addition, a user information table 1200 of the worker "Ichiro Suzuki" shows that "Ichiro Suzuki" has two types of user terminals 150 and there is a possibility that work may be carried out in one of the user terminals 150. The user information table 1200 is generated from the user basic data table 400 and the user setting data table 500 described above.

FIG. 12 illustrates an example of a data structure of the user information table 1200. The user information table 1200 includes a user name field 1205, a company name/department field 1210, a job title field 1215, a supervisor (approver) field 1220, a working terminal (PC/smartphone) field 1225, a notification setting (e-mail notification ON/OFF and notification frequency) field 1230, a display language field 1235 and a file storage location field 1240. The user name field 1205 stores a user name. The company name/department field 1210 stores a company name and a department name. The job title field 1215 stores a role. The supervisor (approver) field 1220 stores a supervisor (approver). The working terminal (PC/smartphone) field 1225 stores information as to whether the working terminal is a PC or a smartphone. The notification setting (e-mail notification ON/OFF and notification frequency) field 1230 stores a notification setting. As the notification setting, ON/OFF of e-mail notification function and a notification frequency are stored. The display language field 1235 stores a display language. The file storage location field 1240 stores a file storage location.

For example, in FIG. 12, there are "Ichiro Suzuki" and "鈴木一郎" (Japanese notation of "Suzuki") as the user names. "Ichiro Suzuki" and "鈴木 ·郎" respectively have a PC and a smartphone (mobile terminal) as the working terminals, and have English and Japanese as the display languages.

Therefore, the tester needs to check the two types of display screens.

FIG. 13 illustrates a processing example according to the exemplary embodiment. That is, FIG. 13 illustrates the case of the left side of the user information table 1200 (where the working terminal is a PC).

In a work tray display area 1300, a worker display area 1302 and a work tray list display area 1304 are displayed. In the work tray list display area 1304, a "specification disclosure" tray 1305 is displayed. In other words, the work tray display area 1300 has a size suitable for the case where the work tray display area 1300 is displayed on a display device such as a liquid crystal display of the PC, and the contents thereof are displayed in English. "Ichiro Suzuki" is shown in the worker display area 1302".

FIG. 14 illustrates a processing example according to the exemplary embodiment. That is, FIG. 14 illustrates the case of the right side of the user information table 1200 (where the working terminal is a smartphone).

In a work tray display area 1400, a worker display area 1402 and a work tray list display area 1404 are displayed. In the work tray list display area 1404, a "specification disclosure" tray 1405 is displayed. That is, the work tray display area 1400 has a size suitable for a display device of the smartphone (smaller than the work tray display area 1300 illustrated in the example of FIG. 13), and the contents thereof are displayed in Japanese. "鈴木 ·郎" (Japanese notation of "Suzuki") is displayed in the worker display area 1402. The title of the work tray list display area 1404 is written in Japanese (that is, "お仕事トレイ ·覧" which is Japanese notation of "work tray list"). When observing this work tray display area 1400, the tester finds the following improvement points.

The tester realizes "Is the manager using the workflow on the smartphone? Moreover, the displayed name is in Kanji characters. Should I change the display method?" from the worker display area 1402, and realizes "Is the manager working in Japanese? Let's reset the icon name of "specification disclosure" tray 1405 so that it can be understood in Japanese." from the work tray list display area 1404. By applying the user information table 1200 to test the workflow in this manner, it is possible to check the workflow in line with the actual operation.

Second Processing Example

FIGS. 15A and 15B are explanatory diagrams illustrating examples of a workflow having a branch point as a target of the exemplary embodiment.

The workflow illustrated in the example of FIG. 15A includes a work step 1505, a work step 1510, a work step 1515, a work step 1520, a work step 1525, a work step 1530, a work step 1535 and a work step 1540.

In general (in a case of not using this exemplary embodiment), when a workflow is to be exhaustively tested, the workflow needs to be started from the beginning for each pattern. Specifically, it is necessary to test a workflow pattern 1550, a workflow pattern 1555 and a workflow pattern 1560. The workflow pattern 1550 is a pattern that proceeds in order of the work step 1505, the work step 1510, the work step 1515, the work step 1520, the work step 1525 and the work step 1530. The workflow pattern 1555 is a pattern that proceeds in order of the work step 1505, the work step 1510, the work step 1515, the work step 1520, the work step 1525 and the work step 1535. The workflow pattern 1560 is a pattern that proceeds in order of the work step 1505, the work step 1510, the work step 1515, the work step 1520, the work step 1525 and the work step 1540.

The workflow illustrated in the example of FIG. 15B is the same as that illustrated in the example of FIG. 15A.

In order to test the workflow exhaustively, the present exemplary embodiment returns an execution state of the workflow to a previous state, thereby making it possible to efficiently perform comprehensive verification. The "efficiently" here means that there is no need to always execute a workflow from the beginning in testing another pattern.

A workflow pattern 1565 proceeds in order of the work step 1505, the work step 1510, the work step 1515, the work step 1520 and the work step 1525, and the work step 1530 is executed as a workflow pattern 1570. Thereafter, the process returns from the work step 1530 to the work step 1525, and the work step 1535 is executed as a workflow pattern 1575. Thereafter, the process returns from the work step 1535 to the work step 1525, and the work step 1540 is executed as a workflow pattern 1580. By returning the state, the test is performed exhaustively. That is, the three workflow patterns illustrated in the example of FIG. 15B each includes the same processes from the work step 1505 to the work step 1525 as the three patterns (the workflow pattern 1550, the workflow pattern 1555 and the workflow pattern 1560) illustrated in the example of FIG. 15A.

The test execution module 165 can return (or advance) the workflow to an arbitrary work step in the workflow test. Thus, when exhaustively testing a workflow including a branch, the workflow may be tested with less operation without starting the workflow many times.

In addition, the screen display module 170 allows histories and documents to be referred to in units of a series of processes executed in each work step as well as in units of works steps. Generally, a work step includes plural processes. As a result, it is possible to verify whether a process on a document that does not appear on the screen is normally executed.

Figure 19:
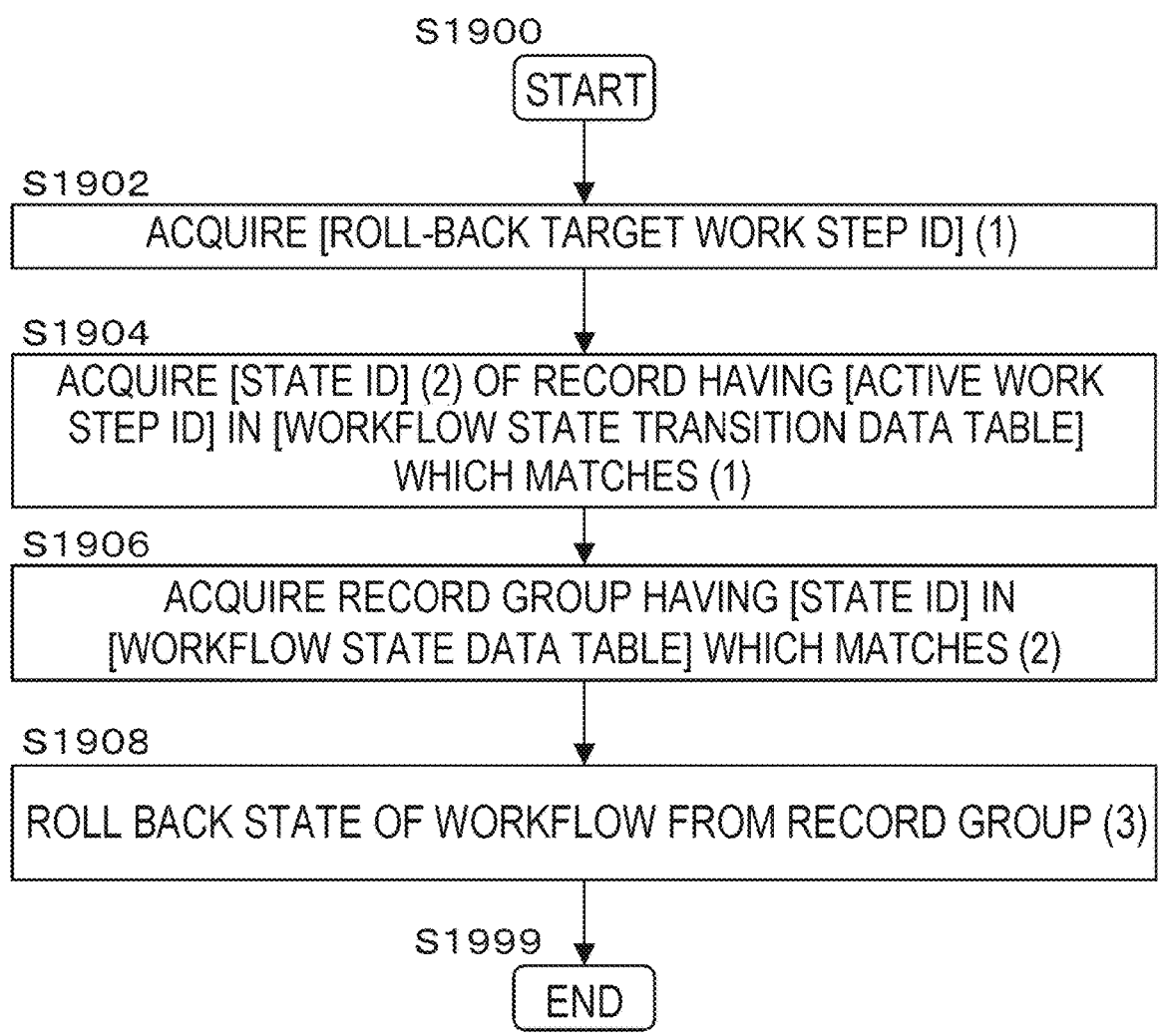
FIG. 19 is a flowchart illustrating a processing example according to the exemplary embodiment.

FIG. 19 is a flowchart illustrating a processing example according to the exemplary embodiment.

In step S1902, a roll-back target work step ID (hereinafter, denoted by (1) in this flowchart) is acquired. In other words, a backtracking work step ID is acquired. The backtracking work step ID may be acquired according to an instruction operation by a tester or by extracting a work step with a branch point.

In step S1904, a state ID of a record having an active work step ID (the active work step ID column 1720) in the workflow state transition table 1700 which matches (1) (hereinafter, denoted by (2) in this flowchart) is acquired.

In step S1906, a record group having the state IDs (the state ID column 1810) in the workflow state data table 1800 which match (2) is acquired (hereinafter, denoted by (3) in this flowchart).

In step S1908, the state of the workflow is rolled back from the record group (3). That is, the workflow state is returned to a state (past state) in the work step acquired in step S1902. Specifically, the work step and a state of each work step executed before the work step are extracted and the state is restored.

For example, when work3 (the third row of the workflow definition table 1600 illustrated in the example of FIG. 16) is designated (step S1902), the second row of the workflow state transition table 1700 illustrated in the example of FIG. 17 is extracted (step S1904), the second and third rows of the workflow state data table 1800 illustrated in the example of FIG. 18 are extracted (step S1906), and the workflow state is returned to the state where the work3 has been executed (step S1908). That is, the workflow is returned to a state where work4 and work5 have not been executed.

A specific example of the process illustrated in the example of FIG. 19 will be described with reference to examples of FIGS. 20 to 25.

Figure 20:
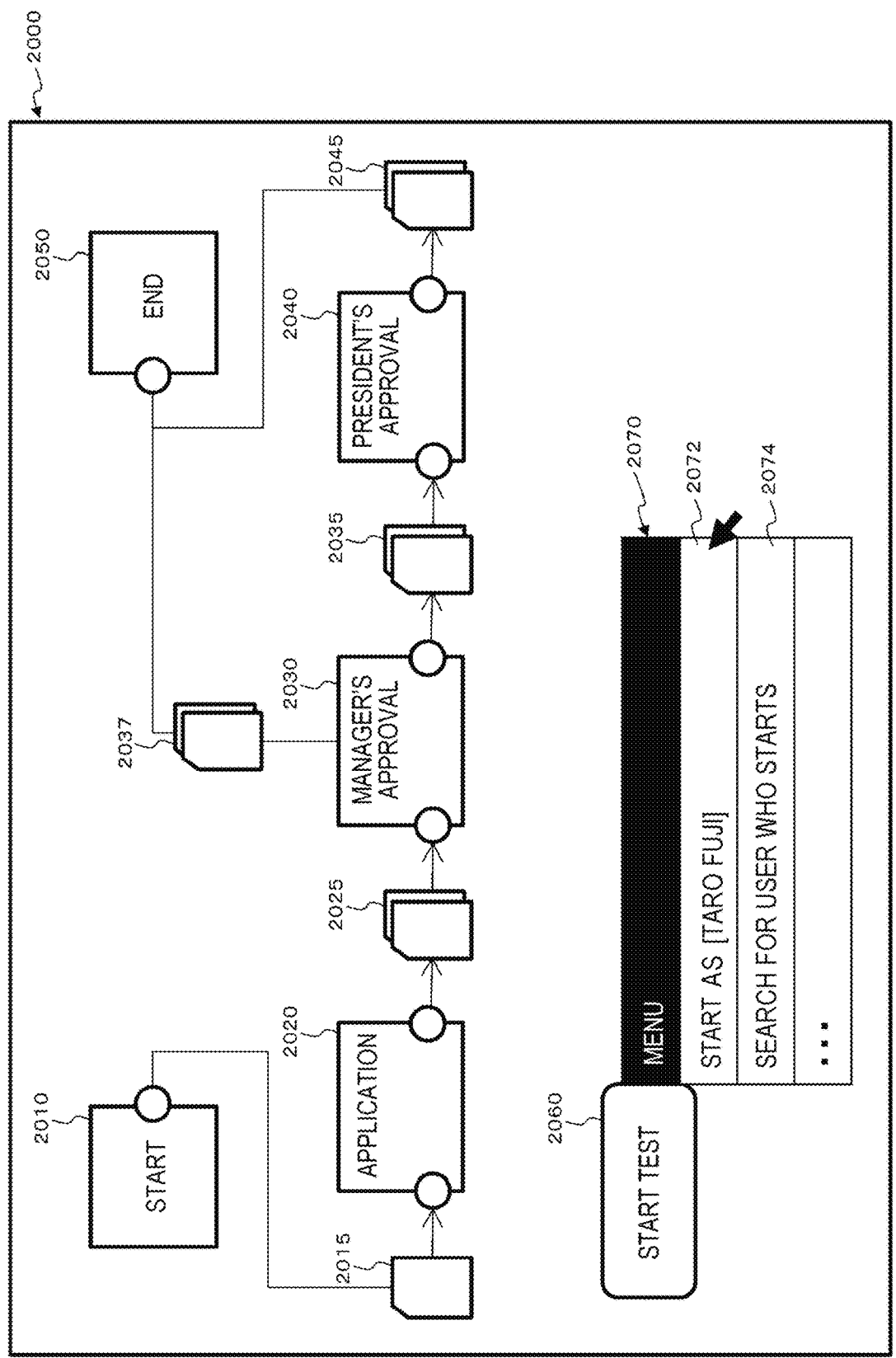
FIG. 20 illustrates a processing example according to the exemplary embodiment.

FIG. 20 illustrates a processing example according to the exemplary embodiment.

A screen 2000 displays, as a workflow, a start 2010, a document 2015, an application 2020, a document 2025, a manager's approval 2030, a document 2035, a document 2037, a president's approval 2040, a document 2045 and an end 2050. The screen 200 further displays a test start button 2060. When it is detected that an operation of selecting the test start button 2060 by a tester, a menu 2070 is displayed. In the menu 2070, for example, "start as [Taro Fuji]" (2072) and "search for a user who starts" (2074) are displayed. "Taro Fuji" in "start as [Taro Fuji]" (2072) is a user of the user terminal 150 that displays the screen 2000. Here, it is assumed that "start as [Taro Fuji]" (2072) is selected.

Figure 21:
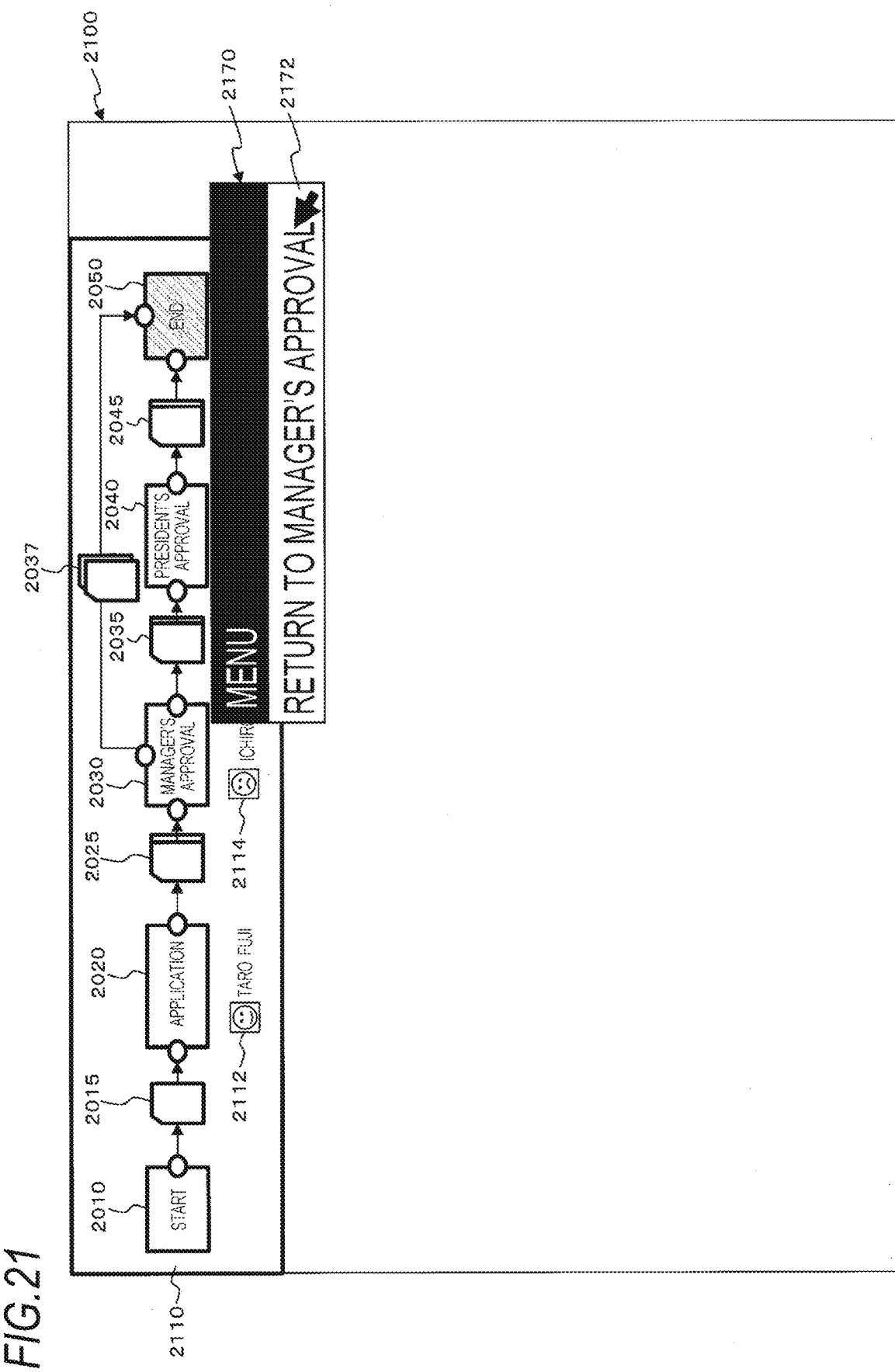
FIG. 21 illustrates a processing example according to the exemplary embodiment.

FIG. 21 illustrates a processing example according to the exemplary embodiment.

A screen 2100 displays a workflow display area 2110. In the workflow display area 2110, the workflow (the start 2010 to the end 2050) illustrated in the example of FIG. 20, and persons in charge in the formal operation (a worker display field 2112, a worker display field 2114 and a worker display field 2216) are displayed. Then, this workflow is tested, and FIG. 21 illustrates a state where the workflow has proceeded to the end 2050.

Here, when it is detected that the tester performs a menu display operation (e.g., pressing the right button of a mouse) in the vicinity of the manager's approval 2030, a menu 2170 is displayed. In the menu 2170, a "return to [manager's approval]" (2172) is displayed. When the test execution module 165 has not tested all the patterns of the workflow, the manager's approval 2030 which is a branch point may be extracted and the menu 2170 may be displayed. In addition, when the menu display operation is detected at a position other than a work step at a branch point, the test execution module 165 may extract the work step at the branch point, and display the menu 2170.

As the "return to [manager's approval]" (2172) is selected, the workflow returns to the branch work step (the manager's approval 2030) and tests an untested work step. That is, there is no need to start the workflow from the beginning to test another pattern.

Figure 22:
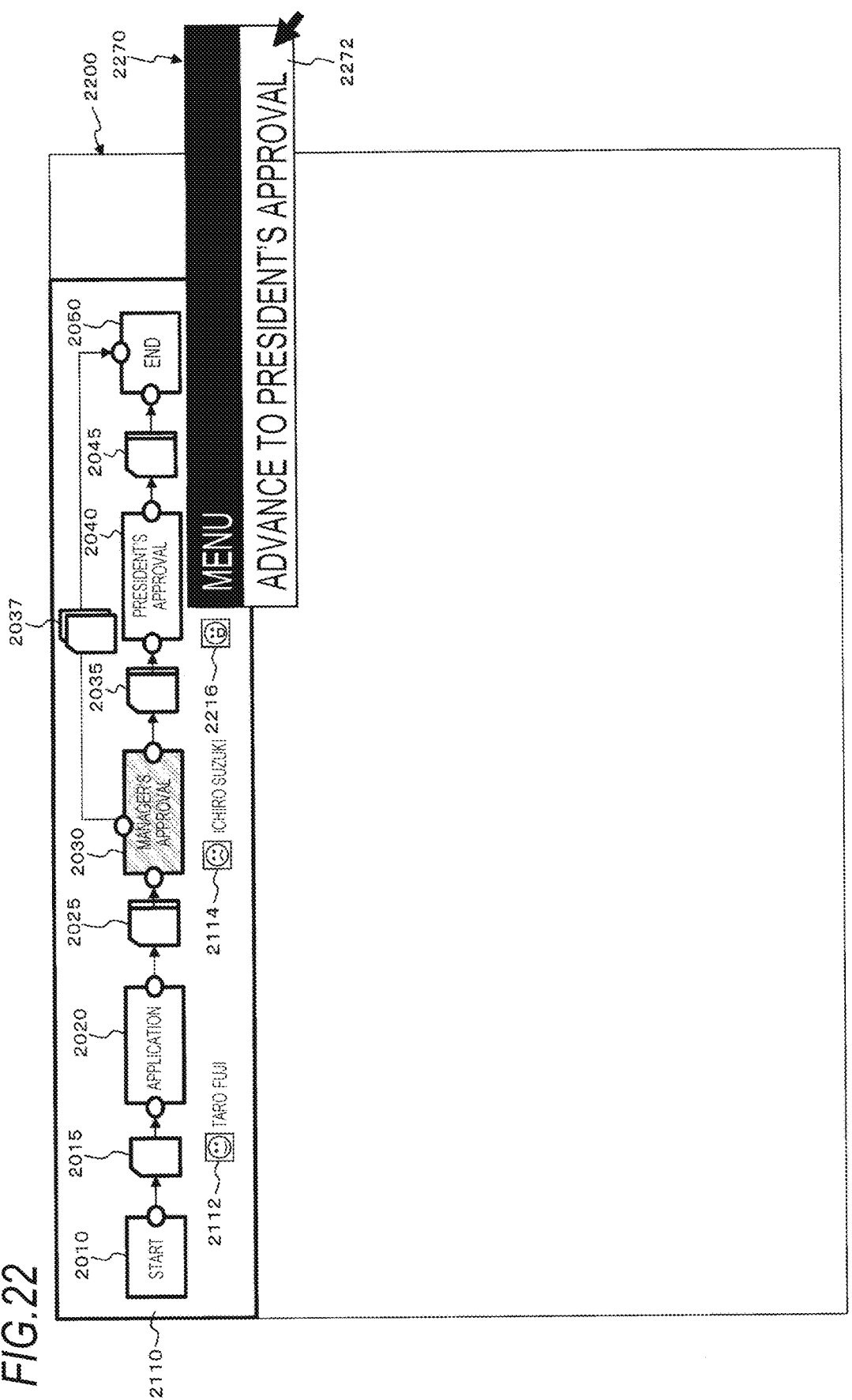
FIG. 22 illustrates a processing example according to the exemplary embodiment.

FIG. 22 illustrates a processing example according to the exemplary embodiment.

On a screen 2200, a workflow display area 2110 is displayed. In this scene, the president's approval 2040 has been tested and a pattern that proceeds from the manager's approval 2030 to the end 2050 has not yet tested. However, the tester may want to re-test the president's approval 2040.

Then, when the menu display operation is detected in the vicinity of the president's approval 2040, a menu 2270 is displayed. In the menu 2270, an "advance to [president's approval]" (2272) is displayed.

Of course, when the menu display operation is detected in the vicinity of the document 2037, the menu 2270 having the "advance to the end 2050" is displayed.

Figure 23:
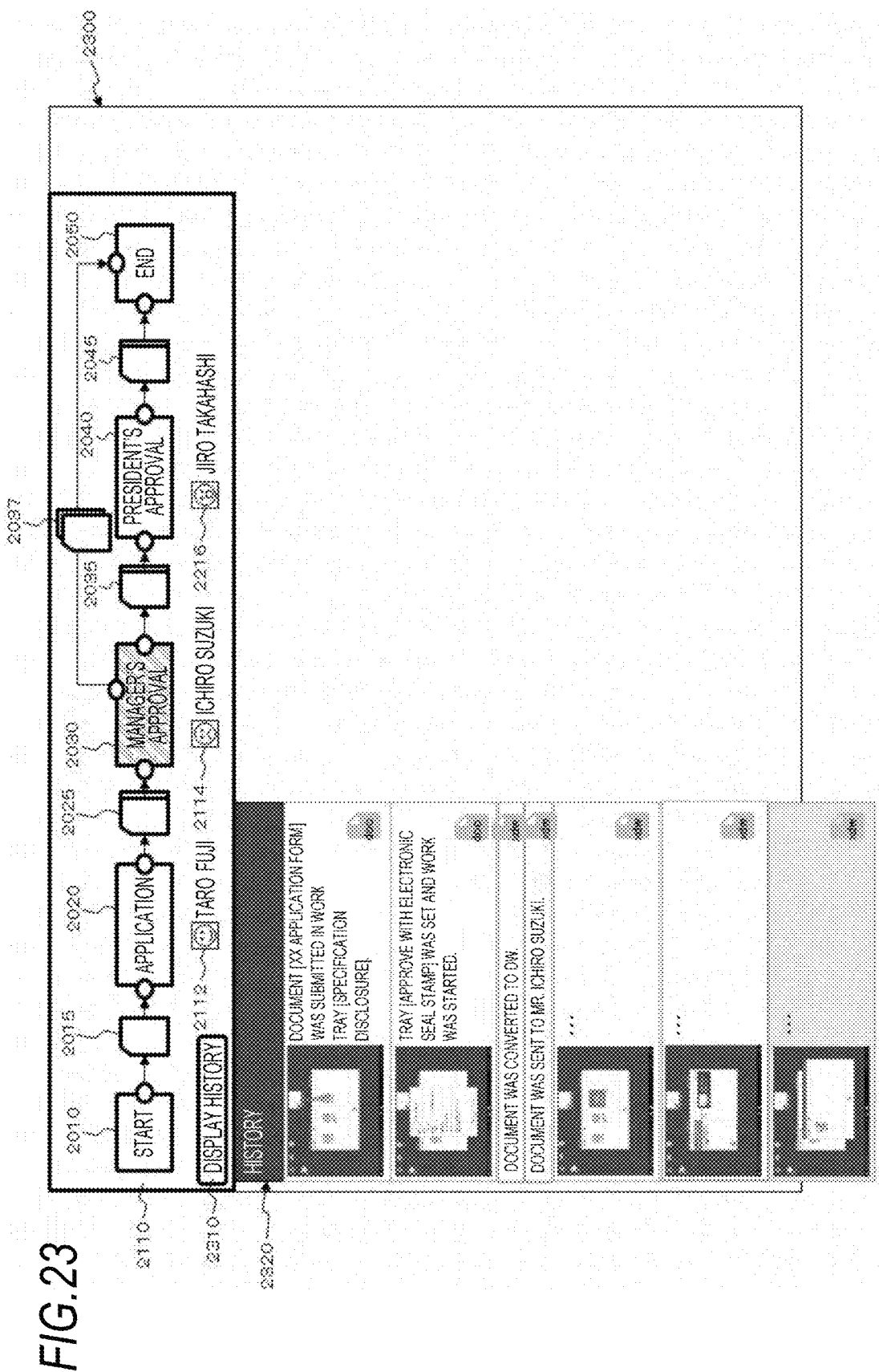
FIG. 23 illustrates a processing example according to the exemplary embodiment.

FIG. 23 illustrates a processing example according to the exemplary embodiment.

On a screen 2300, a workflow display area 2110 is displayed. In addition to the workflow, a "display history" button 2310 is displayed in the workflow display area 2110. When it is detected that the "display history" button 2310 is selected, a history list display area 2320 is displayed. The contents in this history list display area 2320 are generated from the work step state data column 1820 of the workflow state data table 1800 illustrated in the example of FIG. 18. The history list display area 2320 will be described in detail with reference to FIG. 24.

In addition, in the workflow display area 2110, a work step that is a branch point is displayed in a form different from other work steps (the application 2020, etc.) (e.g., the manager's approval 2030 is displayed in yellow). The manager's approval 2030 branches on the appearance of the workflow. However, as described above, a work step executed by a person in charge who has plural types of user terminals 150 may be set to a work step which is a branch point. For example, since a desktop personal computer, a mobile terminal, etc. are different from each other in screen sizes and the like, the display contents thereon are different from each other. Therefore, it is necessary to conduct a test on the plural types of user terminals 150.

Figure 24:
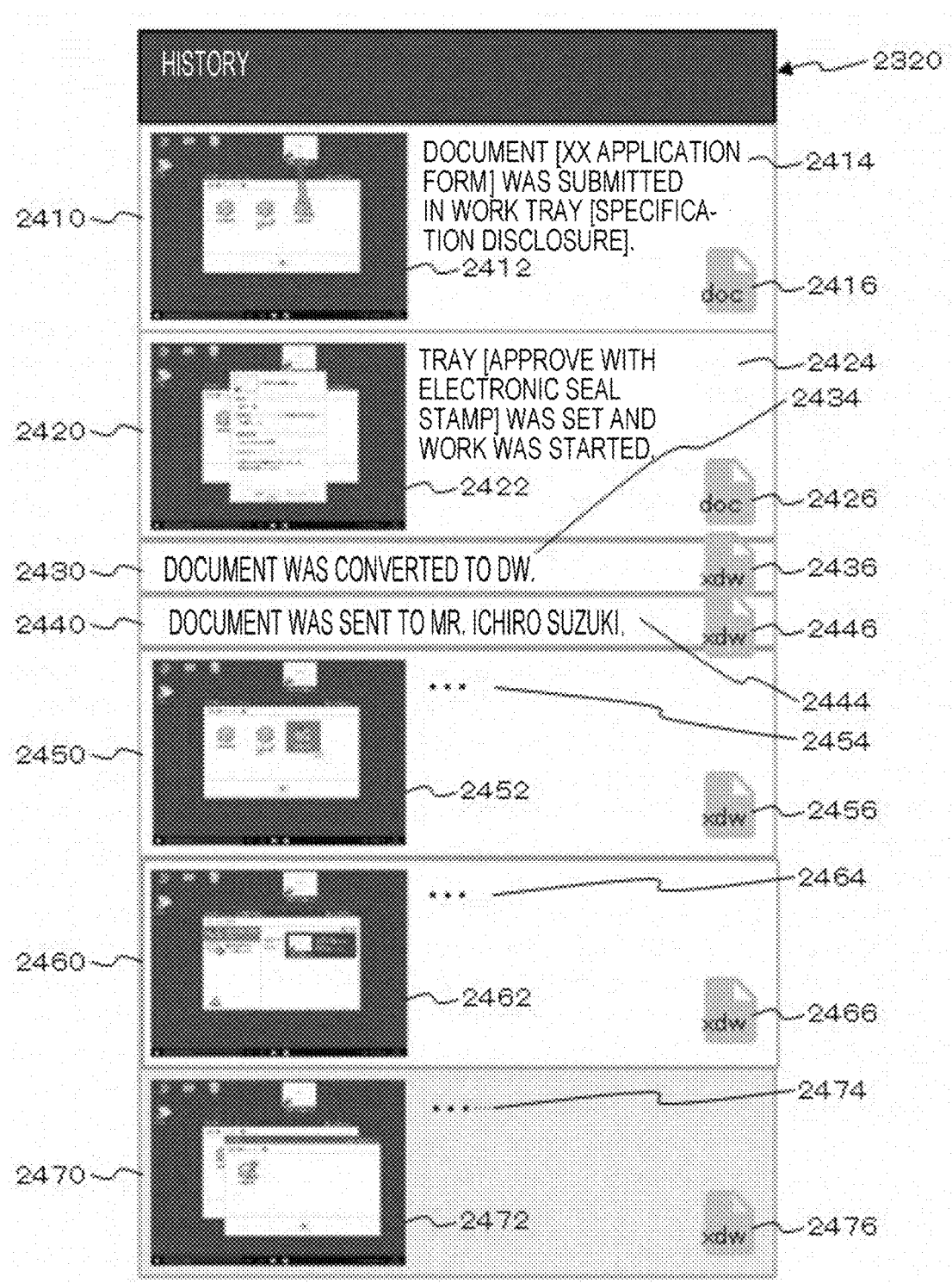
FIG. 24 illustrates a processing example according to the exemplary embodiment.

FIG. 24 illustrates a processing example according to the exemplary embodiment.

In the history list display area 2320, a history 2410, a history 2420, a history 2430, a history 2440, a history 2450, a history 2460 and a history 2470 are displayed. The history list display area 2320 displays the history of tests in each work step (each process when there are plural processes in the work step) in time series. For example, a screenshot image of a desktop screen at a time when a work step is executed, the process contents, the state of a target document in the process (in the example of FIG. 24, document conversion being performed and a document type (doc, xdw, PDF, html, jpg, etc.)) is displayed. Specifically, the followings are displayed.

In the history 2410, a history screen 2412, a work step content 2414 and a document 2416 are displayed. For example, as the work step content 2414, "Document [XX application form] was submitted in work tray [specification disclosure]" is displayed.

In the history 2420, a history screen 2422, a work step content 2424 and a document 2426 are displayed. For example, as the work step content 2424, "Tray [approve with electronic seal stamp] was set and the work was started" is displayed.

In the history 2430, a work step content 2434 and a document 2436 are displayed. For example, as the work step content 2434, "Document was converted to DW" is displayed.

In the history 2440, a work step content 2444 and a document 2446 are displayed. For example, as the work step content 2444, "Document was sent to Mr. Ichiro Suzuki" is displayed.

In the history 2450, a history screen 2452, a work step content 2454 and a document 2456 are displayed. For example, a " . . . " is displayed as the work step content 2454.

In the history 2460, a history screen 2462, a work step content 2464 and a document 2466 are displayed. For example, a "..." is displayed as the work step content 2464.

In the history 2470, a history screen 2472, a work step content 2474 and a document 2476 are displayed. For example, a "..." is displayed as the work step content 2474.

By selecting a history in the history list display area 2320, it is also possible to return to that process. In this case, it is possible to return (or advance) to the process in finer unit (e.g., the processing unit such as the history 2430 or the history 2440) than that in a case where a work step in the workflow display area 2110 is selected and is returned to the process.

It is also possible to browse a document (e.g., the document 2416) in the history. Of course, a document at the history point (before or after a process) is displayed.

Figure 25:
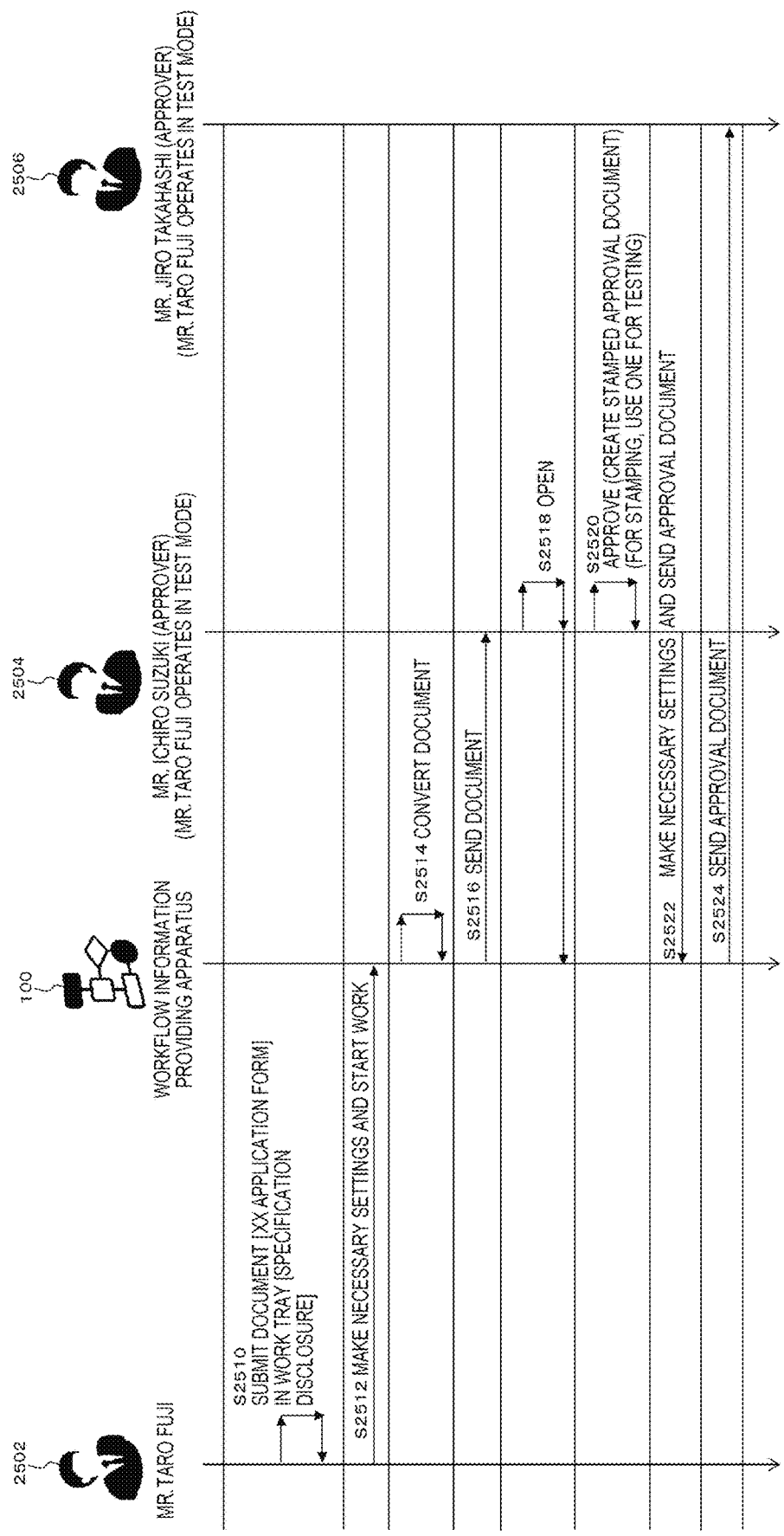
FIG. 25 is a flowchart illustrating a processing example according to the exemplary embodiment.

FIG. 25 is a flowchart illustrating a processing example according to the exemplary embodiment. The histories in the history list display area 2320 illustrated in the example of FIG. 24 are generated by the process illustrated in the example of FIG. 25. For the workflow information providing apparatus 100, the contents of processes that are performed in response to operations by a user (Mr. Taro Fuji) 2502, a user (Mr. Ichiro Suzuki) 2504 and a user (Mr. Jiro Takahashi) 2506 are illustrated. The user (Mr. Taro Fuji) 2502 is the person in charge of the application 2020, the user (Mr. Ichiro Suzuki) 2504 is the person in charge of the manager's approval 2030, and the user (Mr. Jiro Takahashi) 2506 is the person in charge of the president's approval 2040. It should be noted that since this process is in a test mode, the user (Mr. Taro Fuji) 2502 performs an operation instead of the user (Mr. Ichiro Suzuki) 2504 and the user (Mr. Jiro Takahashi) 2506.

In step S2510, the user (Mr. Taro Fuji) 2502 submits the document [XX application form] in the work tray [specification disclosure]. This corresponds to the history 2410 illustrated in the example of FIG. 24.

In step S2512, the user (Mr. Taro Fuji) 2502 makes necessary settings for the workflow information providing apparatus 100, and starts work. This corresponds to the history 2420 illustrated in the example of FIG. 24.

In step S2514, the workflow information providing apparatus 100 performs document conversion. This corresponds to the history 2430 illustrated in the example of FIG. 24.

In step S2516, the workflow information providing apparatus 100 sends a document to the user (Mr. Ichiro Suzuki) 2504. This corresponds to the history 2440 illustrated in the example of FIG. 24.

In step S2518, the user (Mr. Ichiro Suzuki) 2504 opens the sent document. This corresponds to the history 2450 illustrated in the example of FIG. 24.

In step S2520, the user (Mr. Ichiro Suzuki) 2504 approves (i.e., creates a stamped approval document). For the stamping, one for test is used. This corresponds to the history 2460 illustrated in the example of FIG. 24.

In step S2522, the user (Mr. Ichiro Suzuki) 2504 makes necessary settings for the workflow information providing apparatus 100 and sends an approval document. This corresponds to the history 2470 illustrated in the example of FIG. 24.

In step S2524, the workflow information providing apparatus 100 sends the approval document to the user (Mr. Jiro Takahashi) 2506.

A hardware configuration example of the information processing apparatus of the exemplary embodiment (the workflow information providing apparatus 100 and the user terminal 150) will be described with reference to FIG. 26.

Figure 26:
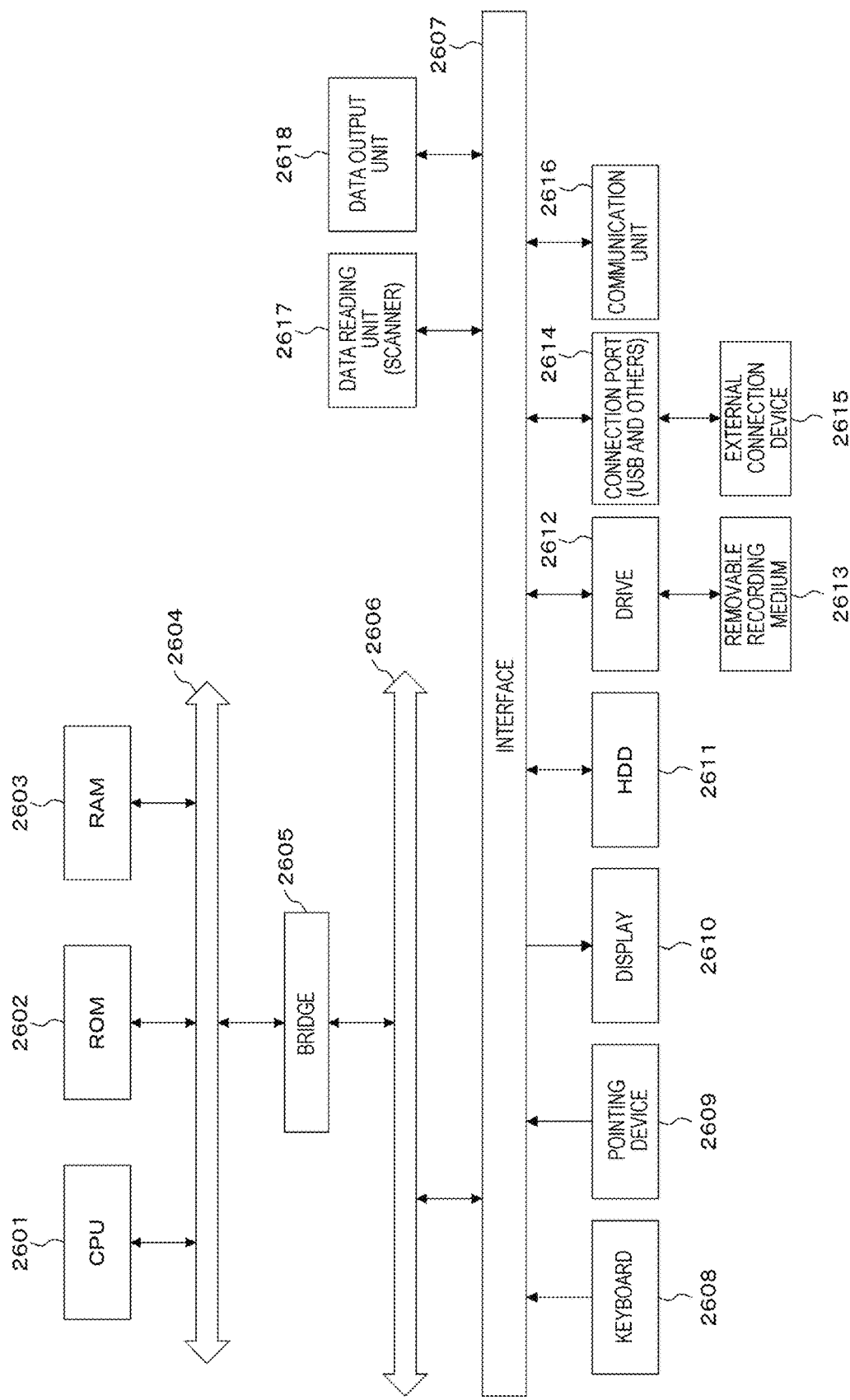
FIG. 26 is a block diagram illustrating a hardware configuration example of a computer that implements the exemplary embodiment.

The configuration illustrated in FIG. 26 is implemented by, for example, a personal computer (PC) or the like, and represents a hardware configuration example including a data reading unit 2617 such as a scanner, and a data output unit 2618 such as a printer.

A CPU (Central Processing Unit) 2601 is a control unit that executes a process according to a computer program describing the execution sequences of various types of modules described in the above exemplary embodiment, such as the software (workflow) operability determination module 110, the software (workflow) execution module 115, the software component provision module 120, the user information provision module 130, the software (workflow) test data storage module 140, the software component acquisition module 155, the user information acquisition module 160, the test execution module 165, the screen display module 170 and so on.

A ROM (Read Only Memory) 2602 stores programs, operation parameters and the like used by the CPU 2601. A RAM (Random Access Memory) 2603 stores programs to be used in the execution of the CPU 2601, parameters appropriately changing in the execution thereof, and the like. These components are mutually connected by a host bus 2604 configured with a CPU bus or the like.

The host bus 2604 is connected to an external bus 2606 such as a PCI (Peripheral Component Interconnect/Interface) bus via a bridge 2605.

A keyboard 2608 and a pointing device 2609 such as a mouse are devices operated by an operator. A display 2610 includes a liquid crystal display device, a CRT (Cathode Ray Tube) or the like, and displays various information as text or image information. Further, a touch screen or the like having both functions of the pointing device 2609 and the display 2610 may be used. In that case, in order to implement the function of the keyboard, the keyboard (e.g., so-called a software keyboard, or a screen keyboard) may be drawn by software on the screen (touch screen) without physically connecting the keyboard like the keyboard 2608.

A HDD (Hard Disk Drive) 2611 incorporates a hard disk (which may be a flash memory or the like) and drives the hard disk to record or reproduce programs and information to be executed by the CPU 2601. The hard disk implements functions as the software component storage module 105, the user information storage module 125, the workflow test data storage module 135 and the like. Furthermore, various other data, various computer programs, etc. are stored in the hard disk.

A drive 2612 reads out data or programs recorded on a removable recording medium 2613 mounted thereon, such as a magnetic disk, an optical disc, a magneto-optical disc, or a semiconductor memory, and supplies the data or programs to the RAM 2603 connected via the interface 2607, the external bus 2606, the bridge 2605 and the host bus 2604. The removable recording medium 2613 may also be used as a data recording area.

A connection port 2614 is a port that connects an external connection device 2615 and has a connection part such as a USB or an IEEE 1394. The connection port 2614 is connected to the CPU 2601 and the like via the interface 2607, the external bus 2606, the bridge 2605, the host bus 2604 and the like. A communication unit 2616 is connected to a communication line and executes a process of data communication with the outside. The data reading unit 2617 is, for example, a scanner, and executes a document reading process. The data output unit 2618 is, for example, a printer, and executes a document data outputting process.

The hardware configuration of the information processing apparatus illustrated in FIG. 26 (the workflow information providing apparatus 100 and the user terminal 150) is only one example. The present exemplary embodiment is not limited to the configuration illustrated in FIG. 26 but may be implemented with any configuration as long as the modules described in the present exemplary embodiment may be executed. For example, some of the modules may be configured with dedicated hardware (e.g., an application specific integrated circuit (ASIC), etc.), some of the modules are may be in an external system and may be connected via a communication line. Further, plural systems illustrated in FIG. 26 may be interconnected via a communication line so as to operate in cooperation. For example, the modules may be incorporated in a personal computer, a portable information communication device (e.g., including a mobile phone, a smartphone, a mobile device, or a wearable computer), an information home appliance, a robot, a copier, a facsimile, a scanner, a printer, or a multifunction machine (e.g., an image processing apparatus having at least two functions of a scanner, a printer, and a facsimile).

The program described above may be stored in a recording medium or may be provided by a communication unit. In that case, for example, the program described above may "a non-transitory computer readable recording medium storing a program".

The "non-transitory computer readable medium storing a program" refers to a non-transitory computer readable medium in which a program is recorded and which is used for installation, execution, distribution and so on of programs.

Examples of the recording medium may include a digital versatile disc (DVD) such as "DVD-R, DVD-RW, DVD-RAM, DVD+R, DVD+RW, etc.", which are standards formulated by the DVD forum, a compact disc (CD) such as CD-ROM, CD recordable (CD-R), CD rewritable (CD-RW) and the like, a Blu-ray (registered trademark) disc, a magneto-optical disc (MO), a flexible disc (FD), a magnetic tape, a hard disk, a read only memory (ROM), an electrically erasable and rewritable read only memory (EEPROM (registered trademark)), a flash memory, a random access memory (RAM), a SD (Secure Digital) memory card, and the like.

The whole or part of the above-described program may be recorded in the recording medium for storage, distribution and the like. Further, the whole or part of the above-described program may be transmitted by communications using transmission media such as a wired network, a wireless communication network or a combination thereof used for a local area network (LAN), a metropolitan area network (MAN), a wide area network (WAN), the Internet, an intranet, an extranet and the like, or may be carried on a carrier wave.

Further, the above-described program may be a part or the whole of another program, or may be recorded on a recording medium together with a separate program. Further, the above-described program may be divided and recorded in plural recording media. Further, the above-described program may be recorded in any restorable manner as long as it may be compressed or coded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus for testing a workflow and being operated by a tester, the workflow being a series of ordered work steps where a document is transferred between the ordered work steps, the ordered work steps including at least a first work step and a subsequent second work step, the information processing apparatus comprising:

a display; and a processor programmed to:

while the display displays a graphical user interface (GUI) depicting the workflow in entirety including each of the ordered work steps and an image representing the document between every two adjacent icons representing the ordered work steps:

acquire personal setting information of a first user who is intended to execute the first work step of the workflow, wherein the acquired personal setting information of the first user includes a device ID uniquely identifying a device used by the first user, a display language for the device used by the first user, and a file storage location for the device used by the first user;

dynamically change the GUI in the display to:

dynamically display a name of the first user at a first icon representing the first work step in the workflow, dynamically change the first icon in the workflow to display the first icon in a visual form different from at least a second icon representing the second work step, and display a first simulation screen based on the personal setting information of the first user, the first simulation screen simulating a first screen as it would be displayed on the device uniquely identified with the device ID in the acquired personal setting information of the first user as the first user executes the first work step of the workflow;

acquire personal setting information of a second user who is intended to execute the second work step of the workflow, the second user different from the first user, wherein the acquired personal setting information of the second user includes a device ID uniquely identifying a device used by the second user, a display language for the device used by the second user, and a file storage location for the device used by the second user; and in response to receiving, from the first user, a selection of a button in the first simulation screen displayed in the GUI, dynamically change the GUI in the display to:

dynamically display a name of the second user at the second icon representing the second work step in the workflow, dynamically change the second icon in the workflow to display the second icon in a visual form different from at least the first icon representing the first work step, and display a second simulation screen based on the personal setting information of the second user, the second simulation screen simulating a second screen as it would be displayed on the device uniquely identified with the device ID in the acquired personal setting information of the second user as the second user executes the second work step of the workflow, the second work step of the workflow to be executed by the second user following the execution of the first work step by the first user on the first screen, wherein, in the workflow, the document is to be approved by multiple tiers of people, and each approval step is one of the ordered work steps of the workflow.

2. The information processing apparatus according to claim 1, wherein at least one of the first user and the second user is different from the tester.

3. The information processing apparatus according to claim 1, wherein at least one of the device used by the first user and the device used by the second user is different from the information processing apparatus used by the tester for testing the workflow.

4. The information processing apparatus according to claim 1, wherein the display reflects and displays the personal setting information of the first user or of the second user.

5. The information processing apparatus according to claim 4, wherein the personal setting information of the first user includes a type or specification of the device used by the first user, and the personal setting information of the second user includes a type or specification of the device used by the second user, the type including at least one of a PC and a mobile phone.

6. The information processing apparatus according to claim 1, wherein the processor displays, on the display, a process of the workflow together while the test is being executed.

7. The information processing apparatus according to claim 6, wherein as the process of the workflow, a current work step in the workflow is displayed differently from other work steps.

8. The information processing apparatus according to claim 1, wherein the processor changes a screen on the display according to contents of the test.

9. The information processing apparatus according to claim 1, wherein the first user or the second user can be set.

10. The information processing apparatus according to claim 1, wherein the information processing apparatus is a workflow test apparatus that is configured to:
acquire a workflow;
receive an instruction of a branch point in the workflow; and
execute the workflow from the branch point.

11. The information processing apparatus according to claim 10, wherein the display displays a process of the workflow while a test is being executed.

12. The information processing apparatus according to claim 11, wherein the display displays a state of a document at each step in the workflow.

13. The information processing apparatus according to claim 12, wherein the display displays contents of a process in each step and a screen displayed in the step.

14. The information processing apparatus according to claim 10, wherein the branch point is a step at which different contents are displayed depending on a device that executes a work step in the workflow.

15. The information processing apparatus according to claim 14, wherein the display displays the step serving as the branch point differently from other steps.

16. The information processing apparatus according to claim 10, wherein the branch point is a step having different routes depending on a determination of work in the workflow.

17. A non-transitory computer readable medium storing an information processing program that causes a computer, which tests a workflow and is operated by a tester, the workflow being a series of ordered work steps where a document is transferred between the ordered work steps, the ordered work steps including at least a first work step and a subsequent second work step, to perform functions of:

while a display of the computer displays a graphical user interface (GUI) depicting the workflow in entirety including each of the ordered work steps and an image representing the document between every two adjacent icons representing the ordered work steps:

acquiring personal setting information of a first user who is intended to execute the first work step of the workflow, wherein the acquired personal setting information of the first user includes a device ID uniquely identifying a device used by the first user, a display language for the device used by the first user, and a file storage location for the device used by the first user;

dynamically changing the GUI in the display to:
dynamically display a name of the first user at a first icon representing the first work step in the workflow,
dynamically change the first icon in the workflow to display the first icon in a visual form different from at least a second icon representing the second work step, and
display a first simulation screen based on the personal setting information of the first user, the first simulation screen simulating a first screen as it would be displayed on the device uniquely identified with the device ID in the acquired personal setting information of the first user as the first user executes the first work step of the workflow;

acquiring personal setting information of a second user who is intended to execute the second work step of the workflow, the second user different from the first user, wherein the acquired personal setting information of the second user includes a device ID uniquely identifying a device used by the second user, a display language for the device used by the second user, and a file storage location for the device used by the second user; and in response to receiving, from the first user, a selection of a button in the first simulation screen displayed in the GUI, dynamically changing the GUI in the display to:
dynamically display a name of the second user at the second icon representing the second work step in the workflow,
dynamically change the second icon in the workflow to display the second icon in a visual form different from at least the first icon representing the first work step, and
display a second simulation screen based on the personal setting information of the second user, the second simulation screen simulating a second screen as it would be displayed on the device uniquely identified with the device ID in the acquired personal setting information of the second user as the second user executes the second work step of the workflow, the second work step of the workflow to be executed by the second user following the execution of the first work step by the first user on the first screen, wherein, in the workflow, the document is to be approved by multiple tiers of people, and each approval step is one of the ordered work steps of the workflow.

18. The non-transitory computer readable medium according to claim 17, wherein the information processing program further causes the computer to:
   acquire a workflow;
   receive an instruction of a branch point in the workflow; and
   execute the workflow from the branch point.

* * * * *